(12) United States Patent
Polivy et al.

(10) Patent No.: US 7,784,065 B2
(45) Date of Patent: Aug. 24, 2010

(54) INTERFACE FOR CONSISTENT PROGRAM INTERACTION WITH AUXILIARY COMPUTING DEVICES

(75) Inventors: Daniel J. Polivy, Seattle, WA (US); Matthew P. Rhoten, Kirkland, WA (US); Andrew J. Fuller, Redmond, WA (US); Sriram Viji, Seattle, WA (US); Michael S. Bernstein, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1375 days.

(21) Appl. No.: 11/053,186

(22) Filed: Feb. 7, 2005

(65) Prior Publication Data

US 2006/0176271 A1  Aug. 10, 2006

(51) Int. Cl.
G06F 3/00 (2006.01)
G06F 9/44 (2006.01)
G06F 9/46 (2006.01)
G06F 13/00 (2006.01)

(52) U.S. Cl. .................................................... 719/328
(58) Field of Classification Search .................. 719/328
See application file for complete search history.

(56) References Cited

U.S. PATENT DOCUMENTS

| 4,860,342 A | 8/1989 | Danner |
| 5,159,445 A | 10/1992 | Gitlin |
| 5,388,268 A | 2/1995 | Beach |
| 5,412,417 A | 5/1995 | Tozuka |
| 5,487,181 A | 1/1996 | Dailey |
| 5,491,800 A * | 2/1996 | Goldsmith et al. .......... 709/221 |
| 5,493,692 A * | 2/1996 | Theimer et al. ............ 455/26.1 |
| 5,519,772 A | 5/1996 | Akman |
| 5,533,115 A | 7/1996 | Hollenbach |
| 5,546,538 A | 8/1996 | Cobbley |
| 5,568,540 A | 10/1996 | Grecko |

(Continued)

FOREIGN PATENT DOCUMENTS

EP  0772327 A2  5/1997

(Continued)

OTHER PUBLICATIONS

U.S. Appl. No. 11/509,437, filed Aug. 23, 2006, Bear.

(Continued)

Primary Examiner—Hyung S Sough
Assistant Examiner—KimbleAnn Verdi
(74) Attorney, Agent, or Firm—Workman Nydegger

(57) ABSTRACT

Described is a system and method including an auxiliary display platform having an interface (API) set that provides a way for client applications running on a main computer system to interact with various types of auxiliary displays, irrespective of differences between various device implementations. Interaction includes displaying content and notifications provided by the application, and returning events to the application. In one implementation the API set comprises a set of COM objects that register and perform configuration checks of a client application, send content and notifications to attached devices, and return events from the attached devices. The application may send data to an endpoint corresponding to a communication destination (e.g., a particular auxiliary device application) and a contract (e.g., a format) for the data. The platform and API set thus provide an abstraction layer for applications to provide information independent of any particular auxiliary device implementation.

12 Claims, 11 Drawing Sheets

U.S. PATENT DOCUMENTS

| | | | |
|---|---|---|---|
| 5,657,414 A | 8/1997 | Lett | |
| 5,675,374 A | 10/1997 | Kohda | |
| 5,675,810 A | 10/1997 | Sellers | |
| 5,732,216 A | 3/1998 | Logan | |
| 5,745,761 A * | 4/1998 | Celi et al. | 719/323 |
| 5,764,901 A | 6/1998 | Skarbo | |
| 5,768,164 A | 6/1998 | Hollon | |
| 5,802,305 A | 9/1998 | McKaughan | |
| 5,831,606 A | 11/1998 | Nakajima | |
| 5,896,534 A * | 4/1999 | Pearce et al. | 710/17 |
| 5,907,604 A | 5/1999 | Hsu | |
| 5,959,622 A | 9/1999 | Greer | |
| 5,978,837 A | 11/1999 | Foldare | |
| 5,987,106 A | 11/1999 | Kitamura | |
| 5,991,822 A | 11/1999 | Mealy | |
| 5,991,836 A * | 11/1999 | Renda | 710/58 |
| 5,999,613 A | 12/1999 | Nabkel | |
| 6,006,285 A | 12/1999 | Jacobs | |
| 6,008,806 A | 12/1999 | Nakajima | |
| 6,044,408 A * | 3/2000 | Engstrom et al. | 719/328 |
| 6,052,442 A | 4/2000 | Cooper | |
| 6,101,610 A | 8/2000 | Beebe | |
| 6,118,856 A | 9/2000 | Paarsmark | |
| 6,144,363 A | 11/2000 | Alloul | |
| 6,144,644 A | 11/2000 | Bajzath | |
| 6,160,550 A | 12/2000 | Nakajima | |
| 6,172,703 B1 | 1/2001 | Lee | |
| 6,208,373 B1 | 3/2001 | Fong | |
| 6,215,420 B1 | 4/2001 | Harrison | |
| 6,237,846 B1 | 5/2001 | Lowell | |
| 6,240,168 B1 | 5/2001 | Stanford | |
| 6,266,714 B1 | 7/2001 | Jacobs | |
| 6,279,056 B1 | 8/2001 | Jacobs | |
| 6,282,435 B1 | 8/2001 | Wagner | |
| 6,295,556 B1 * | 9/2001 | Falcon et al. | 709/220 |
| 6,346,934 B1 | 2/2002 | Wugofski | |
| 6,362,440 B1 | 3/2002 | Karidis | |
| 6,380,968 B1 | 4/2002 | Alexander | |
| 6,390,371 B1 * | 5/2002 | Armga et al. | 235/472.01 |
| 6,417,849 B2 | 7/2002 | Lefebvre | |
| 6,438,216 B1 | 8/2002 | Aktas | |
| 6,438,585 B2 | 8/2002 | Mousseau | |
| 6,453,027 B1 | 9/2002 | Kang | |
| 6,483,905 B1 | 11/2002 | Kikinis | |
| 6,484,019 B1 | 11/2002 | Aklian | |
| 6,496,860 B2 * | 12/2002 | Ludtke et al. | 709/223 |
| 6,507,356 B1 | 1/2003 | Jackel | |
| 6,513,128 B1 | 1/2003 | Wang | |
| 6,516,356 B1 * | 2/2003 | Belknap et al. | 719/328 |
| 6,518,957 B1 | 2/2003 | Lehtinen | |
| 6,519,335 B1 | 2/2003 | Bushnell | |
| 6,546,262 B1 | 4/2003 | Freadman | |
| 6,564,270 B1 * | 5/2003 | Andert et al. | 710/33 |
| 6,603,855 B1 | 8/2003 | Cannon | |
| 6,628,194 B1 | 9/2003 | Hellebust | |
| 6,628,267 B2 | 9/2003 | Karidis | |
| 6,658,095 B1 | 12/2003 | Yoakum | |
| 6,671,356 B2 | 12/2003 | Lewis | |
| 6,671,743 B1 | 12/2003 | Verity | |
| 6,674,457 B1 | 1/2004 | Davies | |
| 6,680,845 B2 | 1/2004 | Agata | |
| 6,690,778 B2 | 2/2004 | Kahn | |
| 6,691,233 B1 | 2/2004 | Gannage | |
| 6,718,183 B1 | 4/2004 | Blust | |
| 6,731,316 B2 | 5/2004 | Herigstad | |
| 6,732,365 B2 * | 5/2004 | Belknap et al. | 719/328 |
| 6,741,232 B1 | 5/2004 | Siedlikowski | |
| 6,757,372 B1 | 6/2004 | Dunlap | |
| 6,806,867 B2 | 10/2004 | Arruda | |
| 6,816,881 B1 * | 11/2004 | Mohindra et al. | 709/203 |
| 6,819,961 B2 | 11/2004 | Jacobs | |
| 6,831,657 B2 | 12/2004 | Tsutsumi | |
| 6,882,326 B2 | 4/2005 | Hirayama | |
| 6,888,562 B2 | 5/2005 | Rambo | |
| 6,892,074 B2 | 5/2005 | Tarkiainen | |
| 6,897,851 B2 | 5/2005 | Carini | |
| 6,902,332 B2 | 6/2005 | McLoone | |
| 6,912,283 B2 | 6/2005 | Meyerson | |
| 6,918,123 B1 * | 7/2005 | Shteyn | 719/318 |
| 6,931,007 B2 | 8/2005 | Jones | |
| 6,937,950 B2 | 8/2005 | Cragun | |
| 6,938,174 B2 | 8/2005 | LeKuch | |
| 6,950,119 B2 | 9/2005 | Kakii | |
| 6,952,830 B2 | 10/2005 | Madineni | |
| 6,954,696 B2 | 10/2005 | Ihara | |
| 6,970,556 B2 | 11/2005 | Wall | |
| 6,973,167 B2 | 12/2005 | Kikinis | |
| 6,976,216 B1 | 12/2005 | Peskin | |
| 6,978,439 B2 | 12/2005 | Kelley | |
| 6,980,641 B1 | 12/2005 | Stanford | |
| 6,996,445 B1 | 2/2006 | Kamijo | |
| 7,000,237 B1 * | 2/2006 | Sinha | 719/318 |
| 7,036,110 B2 | 4/2006 | Jeyaraman | |
| 7,068,641 B1 | 6/2006 | Allan | |
| 7,085,814 B1 | 8/2006 | Gandhi | |
| 7,096,391 B2 | 8/2006 | Johnson | |
| 7,106,472 B2 | 9/2006 | Gomez | |
| 7,123,370 B2 | 10/2006 | Watanabe | |
| 7,194,611 B2 | 3/2007 | Bear et al. | |
| 7,203,477 B2 * | 4/2007 | Coppinger et al. | 455/403 |
| 7,209,133 B2 | 4/2007 | Eglit | |
| 7,216,221 B2 | 5/2007 | Bear | |
| 7,227,511 B2 | 6/2007 | Adan | |
| 7,231,229 B1 | 6/2007 | Hawkins | |
| 7,243,130 B2 | 7/2007 | Horvitz | |
| 7,272,660 B1 | 9/2007 | Powers | |
| 7,292,588 B2 | 11/2007 | Milley | |
| 7,302,637 B1 | 11/2007 | Maguire | |
| 7,346,075 B1 * | 3/2008 | Alexander et al. | 370/466 |
| 7,372,371 B2 | 5/2008 | Bear | |
| 7,376,932 B2 | 5/2008 | Chen | |
| 7,401,053 B2 * | 7/2008 | Kamimura et al. | 705/51 |
| 7,424,740 B2 | 9/2008 | Bear | |
| 7,440,556 B2 | 10/2008 | Bear | |
| 7,443,971 B2 | 10/2008 | Bear | |
| 7,478,407 B2 * | 1/2009 | Jain et al. | 719/328 |
| 7,509,651 B2 * | 3/2009 | Catania et al. | 719/316 |
| 7,509,658 B2 * | 3/2009 | Goring et al. | 719/328 |
| 7,519,911 B2 | 4/2009 | Friedman | |
| 7,526,777 B2 * | 4/2009 | Gazda et al. | 719/328 |
| 2001/0034251 A1 | 10/2001 | Goto | |
| 2001/0040551 A1 | 11/2001 | Yates | |
| 2002/0004855 A1 * | 1/2002 | Cox et al. | 709/328 |
| 2002/0015020 A1 | 2/2002 | Mobin | |
| 2002/0019812 A1 | 2/2002 | Board | |
| 2002/0080967 A1 | 6/2002 | Abdo | |
| 2002/0087225 A1 | 7/2002 | Howard | |
| 2002/0099456 A1 | 7/2002 | McLean | |
| 2002/0112058 A1 * | 8/2002 | Weisman et al. | 709/227 |
| 2002/0114430 A1 | 8/2002 | Murata | |
| 2002/0131072 A1 | 9/2002 | Jackson | |
| 2002/0133635 A1 * | 9/2002 | Schechter et al. | 709/310 |
| 2002/0144191 A1 | 10/2002 | Lin | |
| 2002/0167458 A1 | 11/2002 | Baudisch | |
| 2002/0167460 A1 | 11/2002 | Baudisch | |
| 2002/0176366 A1 * | 11/2002 | Ayyagari et al. | 370/245 |
| 2003/0025674 A1 | 2/2003 | Watanabe | |
| 2003/0028685 A1 * | 2/2003 | Smith et al. | 709/328 |
| 2003/0046448 A1 * | 3/2003 | Fischer et al. | 709/328 |
| 2003/0074590 A1 | 4/2003 | Fogle | |
| 2003/0112325 A1 | 6/2003 | Boyden | |
| 2003/0118003 A1 | 6/2003 | Geck | |
| 2003/0122874 A1 | 7/2003 | Dieberger | |
| 2003/0146903 A1 | 8/2003 | Yi | |

| | | | |
|---|---|---|---|
| 2003/0167356 | A1* | 9/2003 | Smith et al. ............... 709/328 |
| 2003/0188041 | A1 | 10/2003 | Fillmore |
| 2003/0191868 | A1* | 10/2003 | Espino ...................... 709/328 |
| 2003/0197685 | A1 | 10/2003 | Yi |
| 2004/0001087 | A1 | 1/2004 | Warmus |
| 2004/0027375 | A1 | 2/2004 | Ellis |
| 2004/0052341 | A1 | 3/2004 | Yeh |
| 2004/0061716 | A1* | 4/2004 | Cheung et al. ............. 345/710 |
| 2004/0103144 | A1* | 5/2004 | Sallam et al. .............. 709/203 |
| 2004/0110490 | A1 | 6/2004 | Steele |
| 2004/0135819 | A1 | 7/2004 | Maa |
| 2004/0141012 | A1 | 7/2004 | Tootill |
| 2004/0155956 | A1 | 8/2004 | Libbey |
| 2004/0177361 | A1* | 9/2004 | Bernhard et al. ........... 719/321 |
| 2004/0210628 | A1* | 10/2004 | Inkinen et al. ............. 709/201 |
| 2004/0222978 | A1 | 11/2004 | Bear |
| 2004/0223058 | A1 | 11/2004 | Richter |
| 2004/0223061 | A1 | 11/2004 | Bear |
| 2004/0225502 | A1 | 11/2004 | Bear |
| 2004/0240167 | A1 | 12/2004 | Ledbetter |
| 2004/0240650 | A1 | 12/2004 | Bear |
| 2004/0266426 | A1 | 12/2004 | Marsh |
| 2005/0005067 | A1 | 1/2005 | Cutler |
| 2005/0068423 | A1 | 3/2005 | Bear |
| 2005/0114517 | A1* | 5/2005 | Maffeis ...................... 709/227 |
| 2005/0172295 | A1* | 8/2005 | Goring et al. .............. 719/310 |
| 2005/0182822 | A1 | 8/2005 | Daniel |
| 2005/0186942 | A1 | 8/2005 | Griffen |
| 2005/0193396 | A1* | 9/2005 | Stafford-Fraser et al. .... 719/328 |
| 2005/0259032 | A1 | 11/2005 | Morris |
| 2005/0262302 | A1 | 11/2005 | Fuller |
| 2006/0048062 | A1 | 3/2006 | Adamson |
| 2006/0061516 | A1 | 3/2006 | Campbell |
| 2006/0095525 | A1 | 5/2006 | Mousseau |
| 2006/0100978 | A1 | 5/2006 | Heller |
| 2006/0129855 | A1 | 6/2006 | Rhoten |
| 2006/0130072 | A1 | 6/2006 | Rhote |
| 2006/0130075 | A1 | 6/2006 | Rhoten |
| 2006/0164324 | A1 | 7/2006 | Polivy |
| 2006/0168355 | A1* | 7/2006 | Shenfield et al. ........... 709/250 |
| 2006/0236221 | A1 | 10/2006 | McCausland |
| 2006/0242590 | A1 | 10/2006 | Polivy |
| 2006/0284787 | A1 | 12/2006 | Bear |
| 2007/0071257 | A1 | 3/2007 | Bear |
| 2007/0150719 | A1 | 6/2007 | Bear |
| 2008/0037741 | A1 | 2/2008 | Bear |
| 2009/0259327 | A1 | 10/2009 | Bear |
| 2009/0305695 | A1 | 12/2009 | Bear |
| 2010/0008488 | A1 | 1/2010 | Bear |
| 2010/0010653 | A1 | 1/2010 | Bear |
| 2010/0054432 | A1 | 3/2010 | Brahm |

FOREIGN PATENT DOCUMENTS

| | | |
|---|---|---|
| EP | 0777394 A1 | 6/1997 |
| EP | 00816990 | 1/1998 |
| EP | 0838934 A1 | 4/1998 |
| EP | 0772327 A3 | 2/1999 |
| WO | 96/02049 A1 | 1/1996 |
| WO | WO/01/69387 | 9/2001 |
| WO | 03/085960 | 10/2003 |

OTHER PUBLICATIONS

Anonymous, International Search Report in Corresponding EP Application No. EP 04 00 9868.
Oxford on-line dictionary, http://dictionary.oed.com/entrance.dtl, Oxford University Press 2007, on the definition of the word "physical" under III/7b.
Office Action mailed Aug. 8, 2007 cited in U.S. Appl. No. 10/996,371.
Office Action mailed Jul. 31, 2007 cited in U.S. Appl. No. 10/677,084.
Office Action mailed Jul. 27, 2007 cited in U.S. Appl. No. 10/996,557.
Office Action mailed Jul. 30, 2007 cited in U.S. Appl. No. 10/430,369.
Office Action mailed Jul. 06, 2007 cited in U.S. Appl. No. 10/429,943.
Notice of Allowance mailed Sep. 7, 2007 cited in U.S. Appl. No. 10/429,931.
Office Action mailed Sep. 24, 2007 Cited in U.S. Appl. No. 10/429,933.
Office Action mailed Feb. 15, 2008 Cited in U.S. Appl. No. 10/429,933.
Notice of Allowance mailed Jan. 30, 2008 cited in U.S. Appl. No. 10/429,931.
Office Action mailed Mar. 21, 2008 cited in U.S. Appl. No. 10/966,557.
Office Action mailed Feb. 28, 2008 cited U.S. Appl. No. 10/996,371.
Office Action mailed Sep. 28, 2007 cited in U.S. Appl. No. 10/429,943.
Office Action mailed Mar. 26, 2008 cited in related U.S. Appl. No. 10/429,943.
Office Action mailed Mar. 18, 2008 cited in U.S. Appl. No. 10/677,118.
Office Action mailed Oct. 15, 2007 cited in U.S. Appl. No. 10/429,903.
Notice of Allowance mailed Apr. 24, 2008 cited in related U.S. Appl. No. 10/429,903.
Notice of Allowance mailed Apr. 23, 2008 cited in U.S. Appl. No. 10/430,369.
Office Action mailed Jan. 11, 2008 cited in U.S. Appl. No. 10/677,084.
Notice of Allowance mailed Apr. 29, 2008 cited in U.S. Appl. No. 10/677,084.
Office Action dated May 15, 2008 cited in U.S. Appl. No. 11/837,302.
Office Action dated Aug. 6, 2008 cited in U.S. Appl. No. 10/429,943.
Office Action dated Aug. 20, 2006 cited in U.S. Appl. No. 10/429,933.
Office Action date Feb. 14, 2007 cited in U.S. Appl. No. 10/429,905.
Office Action dated May 21, 2007 cited in U.S. Appl. No. 10/429,905.
Office Action dated Apr. 4, 2006 cited in U.S. Appl. No. 10/429,930.
Office Action dated Jul. 14, 2006 cited in U.S. Appl. No. 10/429,930.
Office Action dated Nov. 14, 2006 cited in U.S. Appl. No. 10/429,930.
Notice of Allowance dated Mar. 16, 2007 cited in U.S. Appl. No. 10/429,930.
Office Action dated Aug. 9, 2005 cited in U.S. Appl. No. 10/429,932.
Office Action dated Oct. 4, 2005 cited in U.S. Appl. No. 10/429,932.
Office Action dated Mar. 17, 2006 cited in U.S. Appl. No. 10/429,932.
Office Action dated Aug. 15, 2006 cited in U.S. Appl. No. 10/429,932.
Notice of Allowance dated Jan. 25, 2007 cited in U.S. Appl. No. 10/429,932.
Office Action dated Mar. 16, 2006 cited in U.S. Appl. No. 10/677,101.
Office Action dated Sep. 6, 2006 cited in U.S. Appl. No. 10/677,101.
Notice of Allowance dated Feb. 2, 2006 cited in U.S. Appl. No. 10/677,101.
Office Action dated Mar. 26, 2007 cited in U.S. Appl. No. 10/429,931.
Office Action dated Sep. 26, 2006 cited in U.S. Appl. No. 10/430,369.
Office Action dated Mar. 20, 2007 cited in U.S. Appl. No. 10/430,369.
Office Action dated Jan. 3, 2007 cited in U.S. Appl. No. 10/429,903.
Office Action dated Feb. 6, 2007 cited in U.S. Appl. No. 10/429,943.
Office Action dated Jul. 6, 2007 cited in U.S. Appl. No. 10/429,943.
Office Action dated Mar. 6, 2007 cited in U.S. Appl. No. 10/429,933.
Office Action dated Aug. 10, 2005 cited in U.S. Appl. No. 10/677,084.
Office Action dated Jan. 19, 2006 cited in U.S. Appl. No. 10/677,084.
Office Action dated Nov. 1, 2006 cited in U.S. Appl. No. 10/677,084.
Office Action dated Oct. 15, 2008 cited in U.S. Appl. No. 11/509,437.
Office Action dated Oct. 20, 2008 cited in U.S. Appl. No. 11/509,431.

Office Action dated Nov. 6, 2008 cited in U.S. Appl. No. 10/996,557.
Office Action dated Oct. 1, 2008 cited in U.S. Appl. No. 10/996,371.
Office Action dated Nov. 28, 2008 cited in U.S. Appl. No. 10/677,118.
Office Action dated Jan. 2, 2009 cited in U.S. Appl. No. 11/837,302.
Notice of Allowance dated Feb. 6, 2009 cited in U.S. Appl. No. 10/429,943.
Office Action dated Feb. 19, 2009 cited in U.S. Appl. No. 10/996,558.
Notice of Allowance dated Mar. 19, 2009 cited in U.S. Appl. No. 10/677,118.
Notice of Allowance dated Mar. 24, 2009 cited in U.S. Appl. No. 11/837,302.
Office Action dated Apr. 3, 2009 cited in U.S. Appl. No. 11/685,014.
Office Action dated Nov. 5, 2008 cited in U.S. Appl. No. 10/996,634.
Notice of Allowance dated Mar. 30, 2009 cited in U.S. Appl. No. 10/996,634.
Notice of Allowance dated Apr. 6, 2009 cited in U.S. Appl. No. 10/429,943.
Office Action dated Apr. 15, 2009 cited in U.S. Appl. No. 11/509,437.
Notice of Allowance dated Apr. 16, 2009 cited in U.S. Appl. No. 10/996,371.
Office Action dated Apr. 24, 2009 cited in U.S. Appl. No. 11/509,431.
Office Action dated May 12, 2009 cited in U.S. Appl. No. 11/112,456.
Notice of Allowance dated Jul. 21, 2009 cited in U.S. Appl. No. 11/685,014.
Notice of Allowance dated Aug. 27, 2009 cited in U.S. Appl. No. 10/996,558.
Office Action dated Sep. 2, 2009 cited in U.S. Appl. No. 11/053,186.
Office Action dated Sep. 15, 2009 cited in U.S. Appl. No. 11/509,437.
Office Action dated Sep. 25, 2009 cited in U.S. Appl. No. 11/509,431.
Notice of Allowance dated Oct. 5, 2009 cited in U.S. Appl. No. 10/996,557.
Office Action dated Mar. 24, 2010 cited in U.S. Appl. No. 10/429,904.
Office Action dated Nov. 30, 2009 cited in U.S. Appl. No. 11/112,456.
Office Action dated Dec. 24, 2009 cited in U.S. Appl. No. 11/509,431.
Office Action dated Feb. 22, 2010 cited in U.S. Appl. No. 11/509,431.
Office Action dated Apr. 29, 2010 cited in U.S. Appl. No. 12/542,506.

* cited by examiner

INTERFACE FOR CONSISTENT PROGRAM INTERACTION WITH AUXILIARY COMPUTING DEVICES

COPYRIGHT DISCLAIMER

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The invention relates generally to computer systems, and more particularly to an improved system and method for communicating information between a computer system and an auxiliary device.

BACKGROUND OF THE INVENTION

U.S. patent applications Ser. Nos. 10/429,930 and 10/429,932, now U.S. Pat. Nos. 7,240,228 and 7,221,331, respectively, are generally directed towards the concept of computer systems having auxiliary processing and auxiliary mechanisms that provide some auxiliary computing functionality 25 to a main computer system. For example, a small LCD on the lid or side of a laptop computer can provide a user with useful information, such as a meeting location and time, even when the main computer display is not easily visible, e.g., when a laptop computer's lid is closed and/or the main computer is powered down. Controls such as a set of user—selectable responses or supported actions, such as in the form of buttons may be provided to allow the user to interact with the auxiliary device, such as to choose a response to a notification, view different types of data, scroll through appointments among calendar data, read email messages, read directions, and so forth.

Somewhat similar to an auxiliary LCD screen built into a mobile host computer is a mobile telephone, a music playing device, a pocket-sized personal computer, a personal digital assistant or the like, which can each serve as an auxiliary device to a main computer system when coupled to it, such as physically and/or via a wireless (e.g., Bluetooth or infrared) link, or at any point after being coupled to the computer, if the device persists data from the computer, as long as the device is programmed to allow its display and/or other functionality to be leveraged by the main computer. In general, any device with I/O capabilities that can interface in virtually any way with a computer system can potentially serve as an auxiliary computing device.

However, while there are potentially many varieties of devices that can serve as an auxiliary display for a computer system, there is currently no existing platform or API (application programming interface) for programs on the main computer system to interact with auxiliary displays. Existing systems are either closed, whereby ISVs (independent software vendors) are not able to extend the functionality of the platform, or not designed specifically for the types of interactions common with auxiliary displays, and are thus neither simple nor consistent to use.

What is needed is a way for programs running on the main computer system to simply and consistently interact with various types of auxiliary displays, regardless of the differences between various device implementations. The applications should not be required to deal with the specific capabilities of each device, but if desired, should be able to query device capabilities to display customized information on each device.

SUMMARY OF THE INVENTION

Briefly, the present invention provides a system and method, comprising an auxiliary display platform including an interface set that provides a straightforward and consistent way for client applications (i.e., programs running on the main computer system) to interact with various types of auxiliary displays, irrespective of differences between various device implementations, and without having to deal with the specific capabilities of each device (unless desired). The interaction comprises displaying information sent from the client applications, including data, notifications or content of any agreed upon format to be rendered on the device; also, the device may send events or data to the client applications. A user may configure which client applications' data are displayed on which devices.

The architecture exposes auxiliary devices to client applications via an auxiliary display API set, which in one exemplary implementation, is in the form of COM (component object model) interfaces. The API set allows various types of devices to be exposed to client applications in a common manner, independent of the on-device firmware and connection protocol. The API set provides for various functions, including registering a client application with the system, sending content to the attached device or devices, sending notifications to the attached device or devices, and receiving events or data from the attached device or devices. Events may include navigation events, content request events, content change events, and so forth.

In general, the client application sends content and notifications to the auxiliary device, where an auxiliary device application caches and/or renders the content. A simple content format is described, based on an XML schema, that most devices and applications will be encouraged to support. The API set is agnostic to the content that is sent through it. Therefore, the API set also supports sending custom data to custom endpoints that consume the data, wherein an endpoint specifies a destination for communication (e.g., a particular auxiliary device application) and a contract (e.g., a format) for the data. The auxiliary device is also capable of displaying notifications sent by client applications, such as in a special area or atop other content, as well as generating its own notifications based on the data provided from the main computer system. The API set further facilitates the return of events and data from the auxiliary device.

In one implementation the client API set is implemented in code (e.g., unmanaged C++ code) comprising a set of COM interfaces. Client applications create an instance of one or more of the objects/interfaces in their process, and then use those objects to communicate with the auxiliary display platform.

A registration object (e.g., AuxiliaryDisplayRegistrar) implements the interface (e.g., IAuxiliaryDisplayRegistrar) by which client applications register themselves as currently running. The AuxiliaryDisplayRegistrar class maintains a list of interface pointers corresponding to devices which are in use by the API instance. The AuxiliaryDisplayRegistrar class also receives device events indicating when a device is added or removed from the system, and updates its local list appropriately, as well as notifying any existing clients that may be impacted by the change. The AuxiliaryDisplayRegistrar class is also responsible for performing application and device permission checks to determine whether a client application is authorized to use a device.

A notification manager object implements an interface (e.g., IAuxiliaryDisplayNotificationManager) by which client applications can request and revoke notifications on the attached devices. The AuxiliaryDisplayRegistrar object instantiates the notification manager object when a notification registration request is made by a client application (e.g., via the RegisterNotifications method), and lets the notification manager object know about (e.g., provides a pointer to) each device that is enabled for notifications, and returns a pointer to the IAuxiliaryDisplayNotificationManager interface to the requesting client application. When an application uses the interface to request that a notification be shown, the notification manager object pulls the notification information (e.g., title, message, icon/image data and expiration time) from the client application via callbacks, and sends the notification to the devices authorized for use by that client application.

For content, a content manager object (e.g., an object implementing the IAuxiliaryDisplayContentManager interface) is created by the AuxiliaryDisplayRegistrar class in response to a Register method call from a client application. The content manager object is initialized with the Application ID (of the client application) and Endpoint ID (where the data should go) passed during registration, and provides an interface with methods for the client application to use to add content, remove specific content, or remove all content. The interface includes an Add method, which queries the client application to obtain values for some of the properties applicable to the call, and then based on the results, iterates through the devices, requests content from the client application, and sends the content down to the device. Applications can specify that a single piece of content be sent to all of its authorized devices, or they may specify that different content, such as content tailored for the capabilities of a device, may be sent to each of its different devices individually. A remove call attempts to remove a specific piece of content from each device. Content is identified by a persistent unique identifier that is unique within the scope of the application.

For events, another method deals with setting up an event sink, allowing the client application to pass an interface pointer used for event notification. Events may include event notifications for device addition and removal or connection and disconnection (including those generated by changes in application/device authorizations), events in response to queries for properties of connected devices, notification events for key presses, and a content-request event generated when an auxiliary device needs a piece of content that is not currently available to it (either in the cache or otherwise). Applications on the auxiliary device are also capable of generating events, such as device navigation events, selection events, and events related to context menu actions. Other events may be pre-emptive, e.g., in anticipation of a need for data. The particular semantics and content of events are defined by the endpoint (e.g., device application), however in general, the event identifies the device from which it came, the device application/endpoint from which it came, and data that accompanies it.

Other advantages will become apparent from the following detailed description when taken in conjunction with the drawings, in which:

DETAILED DESCRIPTION

Exemplary Operating Environment

Figure 1:
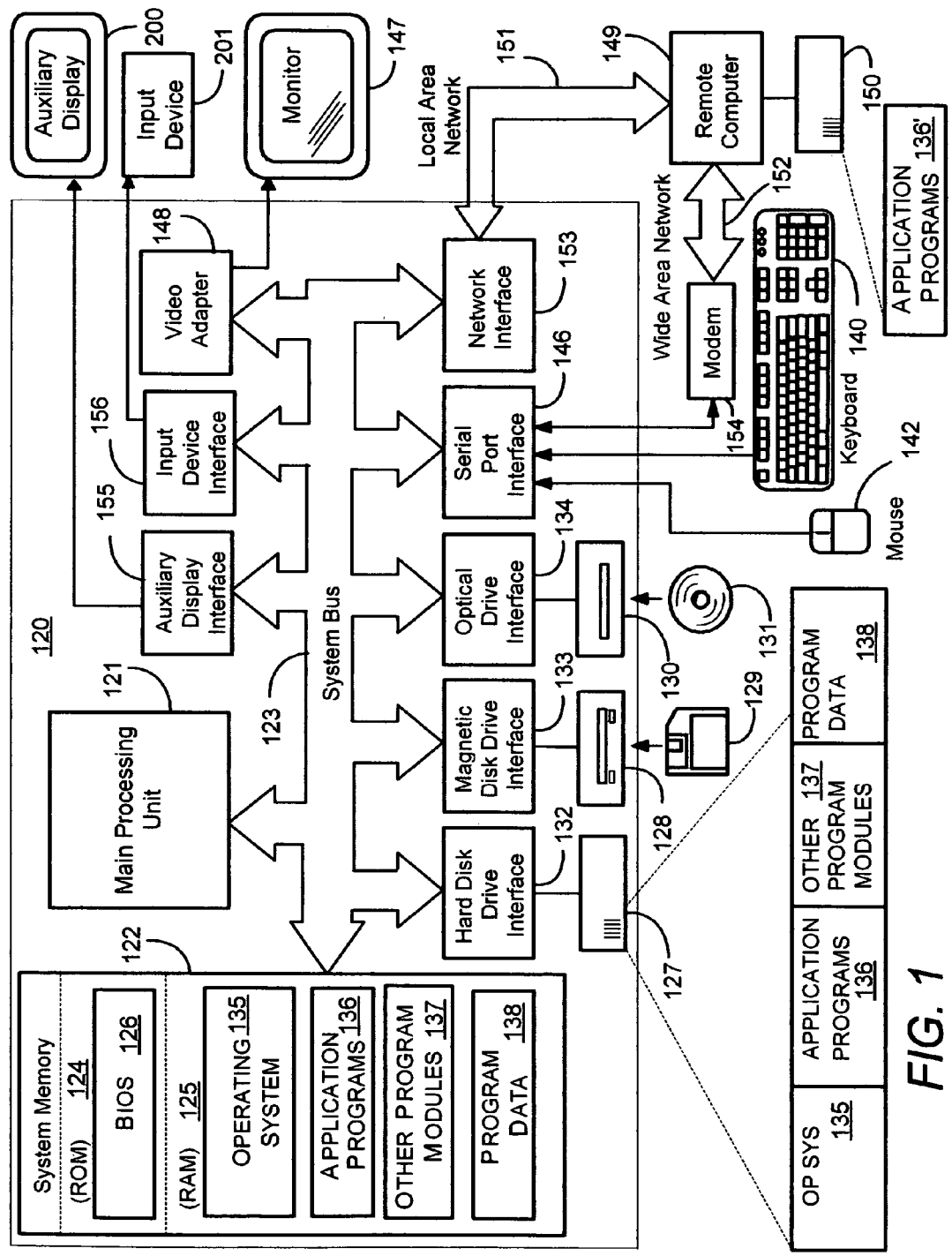
FIG. 1 is a block diagram representing a general purpose computing device in the form of a conventional personal computer system into which the present invention may be incorporated.

FIG. 1 is a block diagram representing a computing device 120 in the form of a personal computer system into which the present invention may be incorporated. Those skilled in the art will appreciate that the personal computer system 120 depicted in FIG. 1 is intended to be merely illustrative and that the present invention may be practiced with other computer system configurations, including hand-held devices, multi-processor systems, microprocessor-based or programmable consumer electronics, network PCs, minicomputers, mainframe computers, headless servers and the like. The invention may also be practiced in distributed computing environments where tasks are performed by remote processing devices that are linked through a communications network. In a distributed computing environment, program modules may be located in both local and remote memory storage devices.

The personal computer system 120 included a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124. The personal computer 120 may further include a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120. Although the exemplary computer system described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary computer system.

A number of program modules may be stored on the hard disk, magnetic disk 129, optical disk 131, ROM 124 or RAM 125, including an operating system 135 (such as Windows® XP), one or more application programs 136 (such as Microsoft® Outlook), other program modules 137 and program data 138. A user may enter commands and information into the personal computer 120 through input devices such as a keyboard 140 and pointing device 142. Other input devices (not shown) may include a microphone, joystick, game pad, satellite dish, scanner or the like. These and other input devices are often connected to the processing unit 121 through a serial port interface 146 that is coupled to the system bus, but may be connected by other interfaces, such as a parallel port, game port or universal serial bus (USB). A monitor 147 or other type of display device is also connected to the system bus 123 via an interface, such as a video adapter 148. In addition to the monitor 147, personal computers typically include other peripheral output devices (not shown), such as speakers and printers. An auxiliary display 200 is an additional output device, and may, for example, be connected to the system bus 123 via an auxiliary display interface 155. An auxiliary display 101 may also connect to a computing device 120 through a serial interface or by other interfaces, such as a parallel port, game port, infrared or wireless connection, universal serial bus (USB) or other peripheral device connection. An input device 201 in FIG. 1 may provide one or more actuators to interface with and/or control the auxiliary display 200, and for example may be part of the auxiliary display device, but alternatively may be independent thereof and connected to the system bus 123 via input device interface 156, which may be a serial interface, or by other interfaces, such as a parallel port, game port, infrared or wireless connection, universal serial bus (USB) or other peripheral device connection.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, Intranets and the Internet.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

It should be noted that the computer system need not be fully operational for an auxiliary device to work in accordance with the present invention. Indeed, an auxiliary device may still work when the computer is powered down, at least to a default extent or to an extent configured by a user, such as when the computer system is in a sleep state or a hibernate mode, and/or when the user has not yet logged on or is otherwise locked out of the system via security mechanisms.

The auxiliary device may supplement the main display and may also serve as a surrogate display when the main display is shut down or otherwise not operational (e.g., disconnected), to give the user some information. For example, information such as how to power up the main display might be helpful, as would a room number and/or directions to a meeting on an auxiliary display device connected to a mobile computer that the user can view when the main display is off and/or not easily visible (e.g., the lid of a laptop is closed). The auxiliary device may play audio and/or video, show images, show calendar information, show emails and so forth.

To enable and control communication in these powered-down modes, firmware may exist, stored in non-volatile memory, which when loaded and operated on by a secondary processor, enables the auxiliary display, along with other auxiliary components to be used, as long as some power is available. Note that as used herein, the terms "firmware" and "device hardware" are essentially equivalent, and can be generally considered as representing the auxiliary memory, the code therein and/or the secondary processor on which it runs.

Figure 2A:
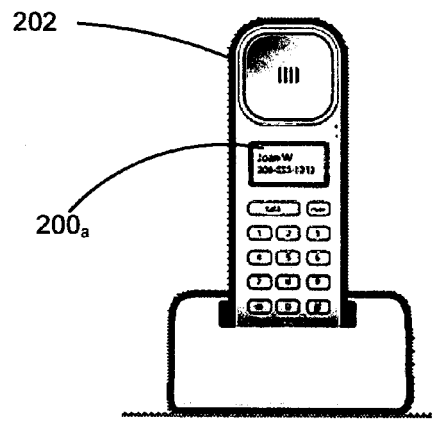
FIGS. 2A-2E are exemplary illustrations generally representing locations for placement of the auxiliary display on various devices.
Figure 2B:
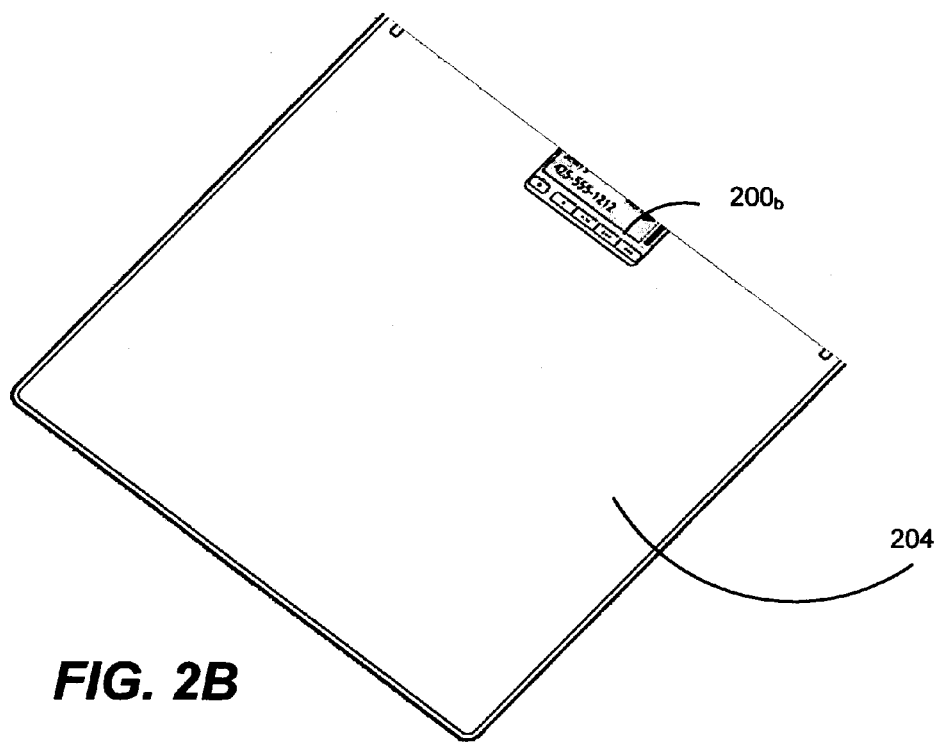
Figure 2C:
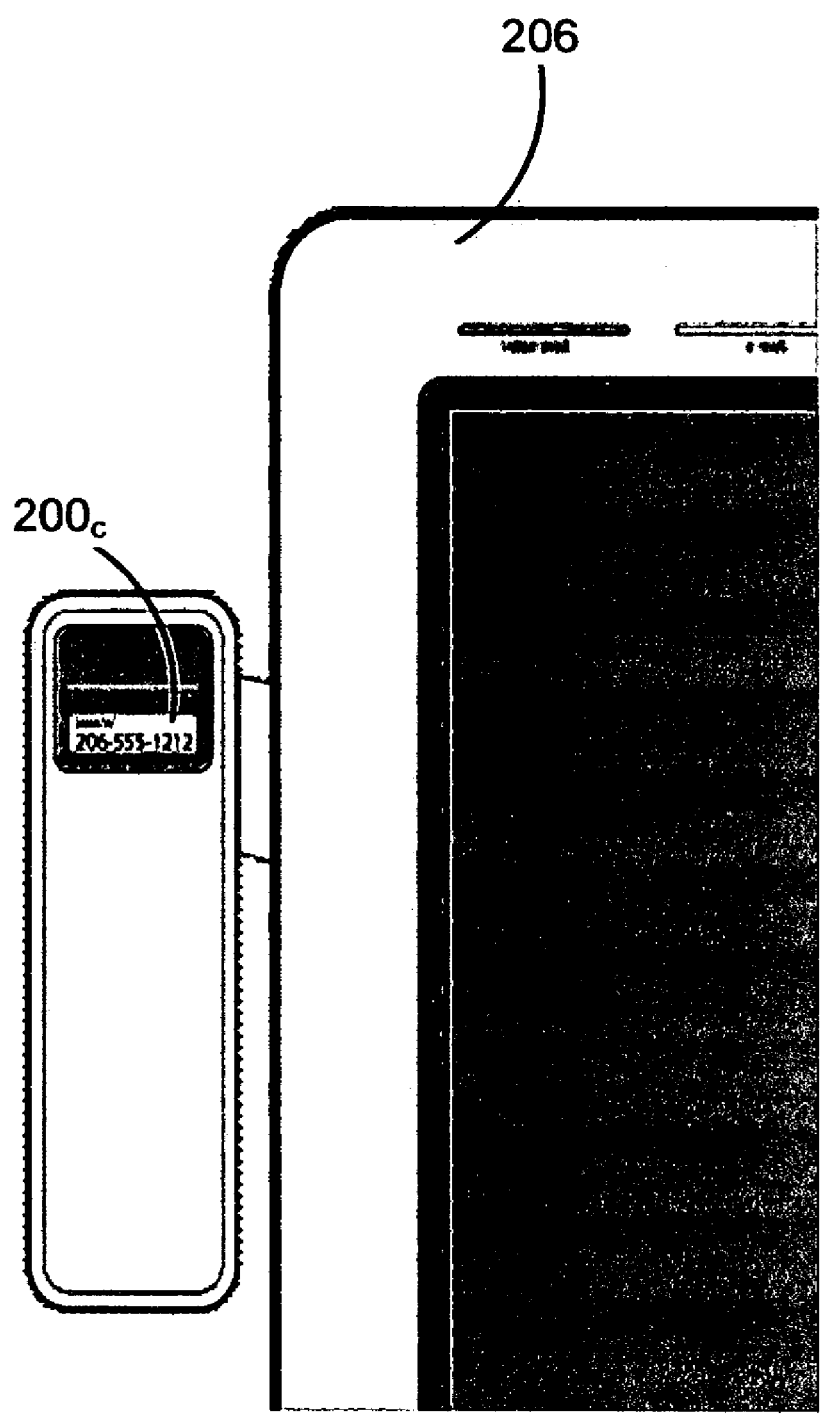
Figure 2D:
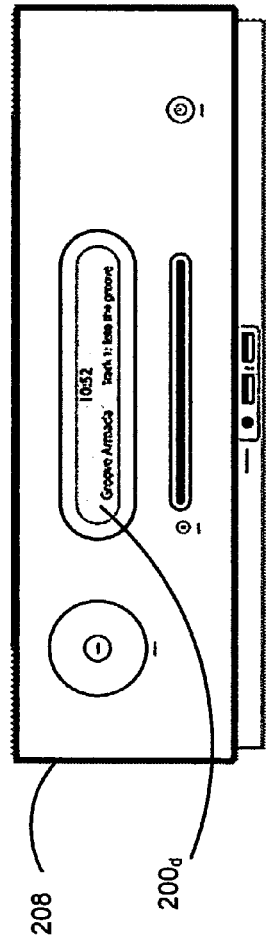
Figure 2E:
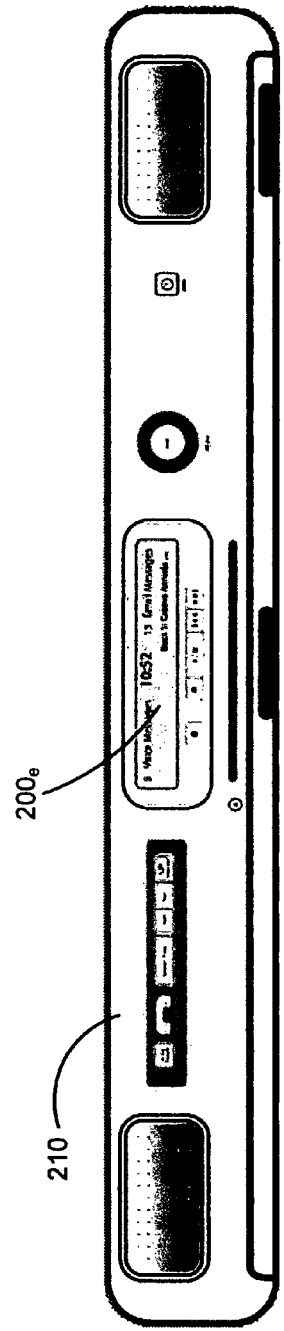
Figure 2E:
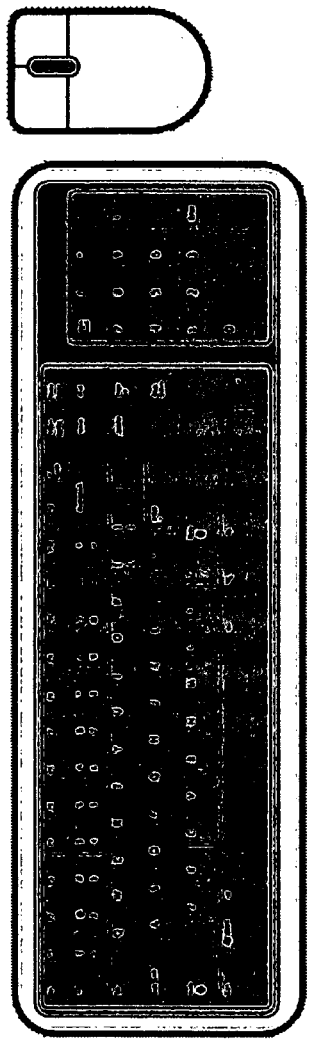

FIGS. 2A-2E illustrate exemplary locations on or associated with computing devices for placement of auxiliary display screens $200_a$-$200_e$, respectively. As represented in FIGS. 2A and 2B, an auxiliary display screen $200_a$ may be placed on the front, back or other surface of a standalone (landline or mobile) phone 202, (which need not be physically coupled if otherwise linked such as via Bluetooth technology) and/or another auxiliary display screen $200_b$ placed on the edge or lid of a mobile computer 204 or tablet computing device (not shown). Another place for an auxiliary display screen $200_c$ (FIG. 2C) may be on a phone mounted on a computer or a peripheral device attached to a computer such as on monitor 206 or on a keyboard (not shown). FIGS. 2D and 2E illustrate additional placements of auxiliary display screens $200_d$ and $200_e$ on the front panel of a standalone console 208 connected to a computer, or some other housing 210 (such as a housing for the motherboard), respectively. Those skilled in the art will appreciate that an auxiliary display screen may be placed on any surface of any computing device or other device having display capabilities, such as placed on a watch with a wireless or other connection to a computer, on a remote control device, on a remote wall-mounted unit, and so forth.

Indeed, the auxiliary display need not be physically close to the main computer system, as the connection may be over a LAN or WAN, or even over the internet.

As should be apparent from FIGS. 2A-2E, an auxiliary display may be in the form of any number of known types of displays such as one or more LEDs, a 2-line alphanumeric display, a monochrome display, or a color display. Those skilled in the art will appreciate that the present invention may also use the display of other computing or communication devices as the auxiliary display 200. These other computing or communication devices include general purpose computers, cell phones, and handheld devices such as a pager or a personal digital assistant (PDA). Additionally, the present invention may use a virtual auxiliary display implemented within an area of the onscreen display of the computing device 120 (e.g. a screensaver or a component of the graphical user interface) as the auxiliary display 200, including before a user has logged in. The auxiliary display 200 may include a combination of any of the forms described above, and also be physically or logically combined with indicators such as one or more LEDs and/or used in conjunction with a virtual auxiliary display.

An auxiliary device may provide functionality even without a screen, or when its screen is powered down. For example, an auxiliary device may play audio, collect data (e.g., for later download to the main computer), perform calculations and so forth. Also, the display may comprise one or more LEDs or the like rather than a full screen. Thus, although many benefits and advantages arise from having an auxiliary display screen, and thus an auxiliary device may be referred to herein as an auxiliary display, a display is not required. In general, an auxiliary display, as referred to herein, may be composed of essentially anything that can be sensed, including any visual, audible, and/or tactile representations.

Interface for Program Interaction with Auxiliary Devices

The present invention is generally directed towards communication with auxiliary devices, such as to provide content, notifications and other information for display on the auxiliary device, and possibly to obtain return information from the device, such as events based on user interaction with the auxiliary device. As will be understood, there are many types of devices that can serve as an auxiliary display device, including those that do not necessarily have displays but can provide some output such as a sound or light. Although a number of examples are used herein, including displays on laptop lids, mobile phones, pocket-sized personal computers, digital image-based picture frames, kitchen displays, televisions, media players, clocks including alarm clocks, watches and so forth, the present invention is not limited to any of these examples, but rather anticipates the use of any device capable of outputting sensory information, even when referred to as an auxiliary "display." For example, other types of devices include auxiliary devices embedded within or using the main display of a consumer electronics device (such as a refrigerator, home theater receiver, DVD player, and so forth), wall displays, automotive, transportation or other vehicular units (e.g., using displays already in a car/train/plane as an auxiliary display), keyboards or other input devices of the main computer system, PDAs (including non-cellular telephone PDAs), and the like. Similarly, the present invention is not limited to any particular mechanism for coupling the auxiliary display to another computer system, and thus is not limited to the wired or wireless examples used herein. The connection may be relatively close or relatively distant, essentially anywhere, such as over a LAN or WAN, or over a virtual private connection over the Internet.

Figure 3:
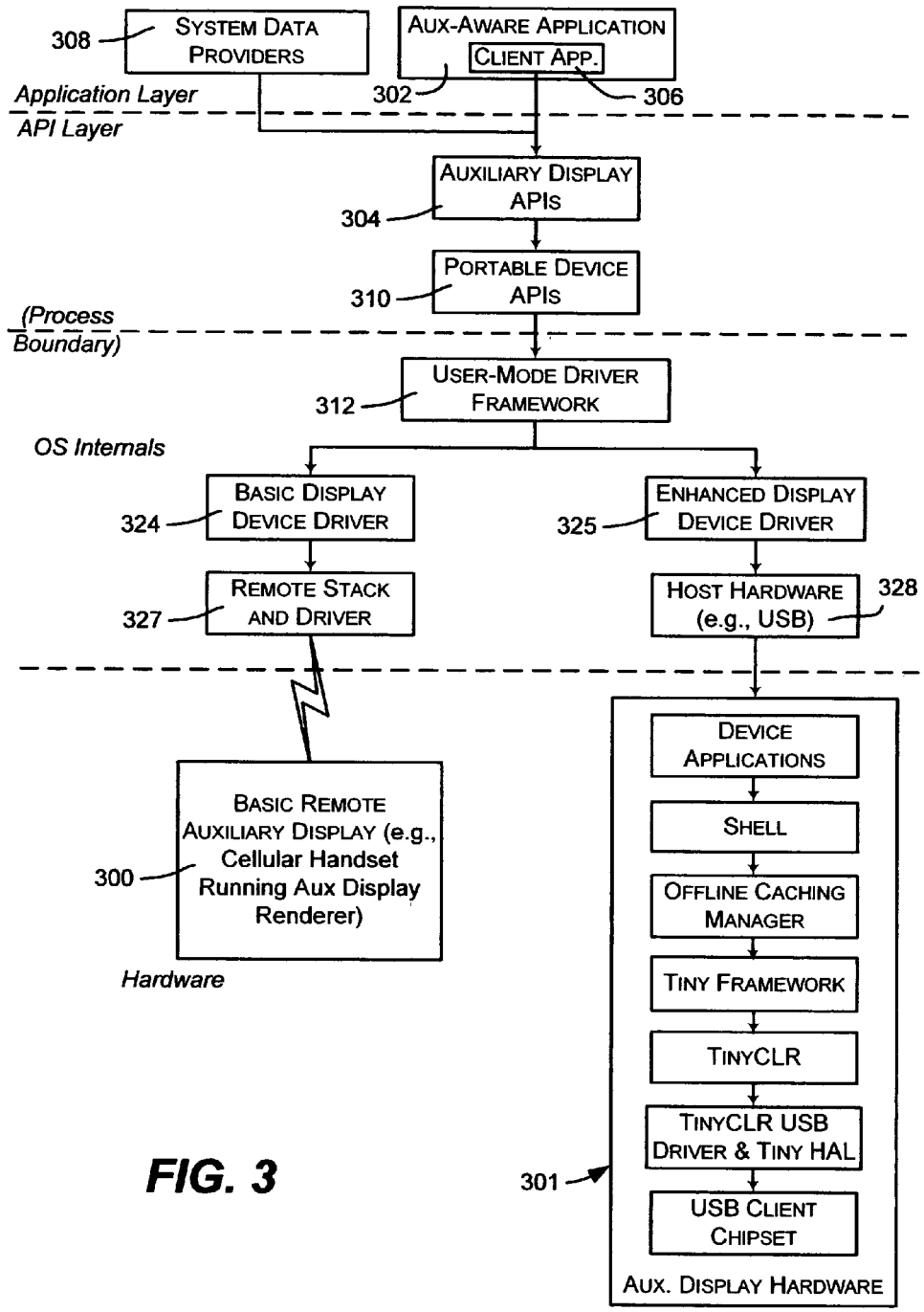
FIG. 3 is a block diagram generally representing an example layered architecture by which client applications can exchange data with the firmware of an arbitrary auxiliary display device in accordance with an aspect of the present invention.

Turning to FIG. 3 of the drawings, there is shown an example architecture that exposes auxiliary devices 300 and/or 301 to clients comprising applications 302 and other programs (e.g., operating system components) via an auxiliary display API set 304. In one exemplary implementation described below, the API set 304 is in the form of C++ accessible COM APIs. The API 304 provides APIs for various functions, including registering a client application 306 (a component of the program or possibly the program itself) with the system, sending content to the attached devices, sending notifications to the attached devices, and receiving events from the attached devices. Events may include navigation events, content request events, content change events, and so forth.

In keeping with various aspects of the present invention described below, the use of the API set 304 exposes only an "auxiliary display system" to the clients that use the API set 304; other (non-API) access to individual devices is feasible, but not necessary. As a result, for an independent software vendor, after registering a program component as a client application (via the API set 304), content may be sent to any auxiliary device using another call to the same API set 304, regardless of the device's actual type and capabilities. Although the user experience may differ, the application need not adapt to the auxiliary device that is present. Note that while an application may also obtain capability information about the auxiliary device, and may choose to act differently based on the capabilities, the application need not do so in order to use the device. This is because the present invention provides an architecture that handles further communications, freeing the application from the complex tasks including tailoring data to any particular device.

The API layer 304 is written on a portable device API set 310, which communicates with the device's driver process via user-mode driver framework 312. The portable device API set 310 enables connection to portable devices such as MP3 players, digital cameras and so forth, and is leveraged by auxiliary displays. The portable device API set 310 maps the auxiliary display into a category of portable devices, and it allows enumeration of the device's capabilities.

In general, the client application 306 sends content and notifications to the auxiliary device. The device is capable of displaying notifications, as well as generating its own notifications based on the data provided from the main computer system. The device provides information back to the client application 306 in the form of events. Note that the components below the application layer and above the device drivers 324 and 325 may be generally referred to as the "auxiliary display platform."

Figure 4:
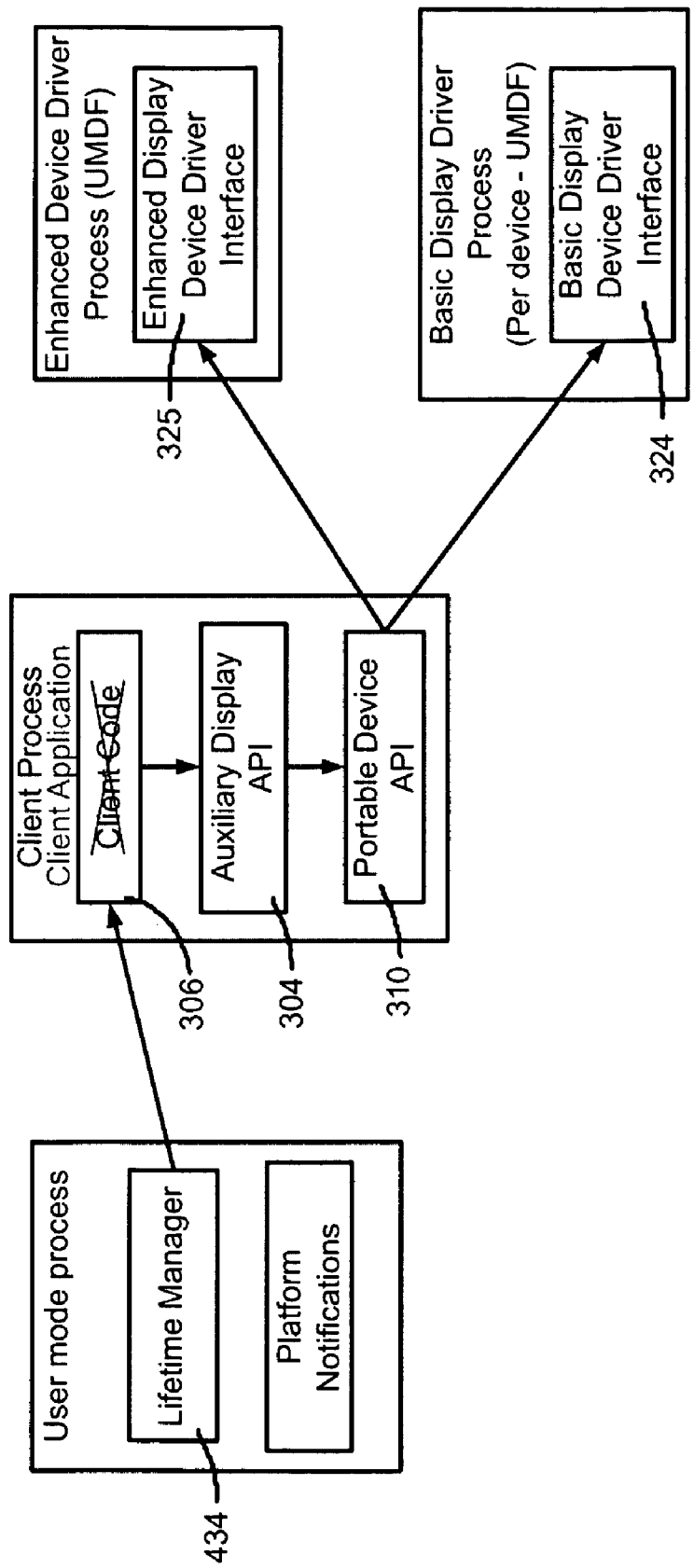
FIG. 4 is an example representation of various components in processes used for communication with auxiliary display devices in accordance with various aspects of the present invention.

In one implementation, generally represented in FIG. 4, the platform leverages existing components, including the portable device API set 310 and the User Mode Driver Framework (UMDF, also referred to as UWDF, or Usermode Windows® device framework), a sandboxed environment for user mode drivers to run in, to provide a unified way to communicate with auxiliary display devices. In keeping with the present invention, various types of devices are exposed in a common manner, independent of the on-device firmware and connection protocol.

Returning to the block diagram represented in FIG. 3, multiple devices may be coupled to a computer to serve as an auxiliary display at the same time. A user may configure (e.g., via a control panel or the like) which client applications' data are displayed on which devices. A system data provider 308 may also supply system information such as time data, wireless signal strength data, the computer's audio volume and mute state, and/or battery level data to auxiliary displays. In one implementation, the auxiliary display platform consults a system-maintained matrix whenever a client application 306 sends content, to determine which device or devices are to receive the information. The API 304 of the auxiliary display platform will also send events (and possibly other information) from auxiliary devices to the client application 306, again using the matrix to route the events back to the client application (or client applications) as appropriate.

Certain types of auxiliary devices, such as the display 301 in FIG. 3, are considered "enhanced" displays because they are configured with certain SPOT (Smart Personal Object Technology) firmware and certain rendering code, and among other things are generally compatible with any information that can be received via the APIs 304. Other auxiliary devices, referred to herein as "basic" displays, comprise any auxiliary display device that runs other custom firmware but is capable of acting as an auxiliary display, e.g., the basic remote auxiliary (cellular handset) display 300 of FIG. 3. The user mode driver framework provides a device driver interface (DDI) for coupling device drivers (e.g., 324 and 325) to the auxiliary display platform. The drivers then forward data corresponding to the API-received information to an appropriate hardware interface (transport) for communication to the auxiliary display device. For example, in FIG. 3, the basic device driver 324 is shown as forwarding data (via a previously defined protocol) to the remote stack and driver 327 for wireless (e.g., Bluetooth, Wi-FI, AM/FM infrared and so forth) communication to the device 300, whereas the enhanced device driver 325 is shown as forwarding data to USB-based hardware 328, although other types of transports including network transports such as TCP/IP-based transports are feasible. As is understood, these connections are only shown for example purposes, as any device driver will forward data for wireless or wired communication as appropriate.

One aspect of the present invention is directed towards the public API set 304 that allows programmatic access to the auxiliary display platform. The client API set 304 supports access to the platform, and as described below, provides mechanisms for instantiation and registration, content management (including sending data), notification management, capability queries, and eventing. The content that a client application sends to devices depends on the endpoint with which it is registered. As described above, one generic format that most devices will support is the simple content format, e.g., based on an XML schema that describes layout primitives that provide ISVs with flexibility in developing client applications that work across a wide variety of devices with varying display capabilities. For example, the simple content format may support content pages comprising images and text, menu pages comprising a scrollable list of items that can be selected as an action, dialogs comprising a user interface dialog box and options, and context menus, e.g., by which the user may invoke a context-sensitive action.

The client API set 304 also supports sending custom data to custom endpoints that consume the data, wherein an endpoint specifies a destination for communication (e.g., a particular auxiliary device application) and a contract (e.g., a format) for the data. The API set 304 further facilitates the return of events from the auxiliary device and notifications sent to the auxiliary device.

In accordance with an aspect of the present invention, a mechanism to extend the auxiliary display platform is provided by enabling ISVs to provide content in a format that can be rendered on any auxiliary display. To this end, the client API 304 provides a framework which ISVs use to extend their applications to the auxiliary display platform. As described below, once a client application registers with the platform, the API set 304 provides the mechanism to push content to the devices and to respond to events from the devices.

Figure 5:
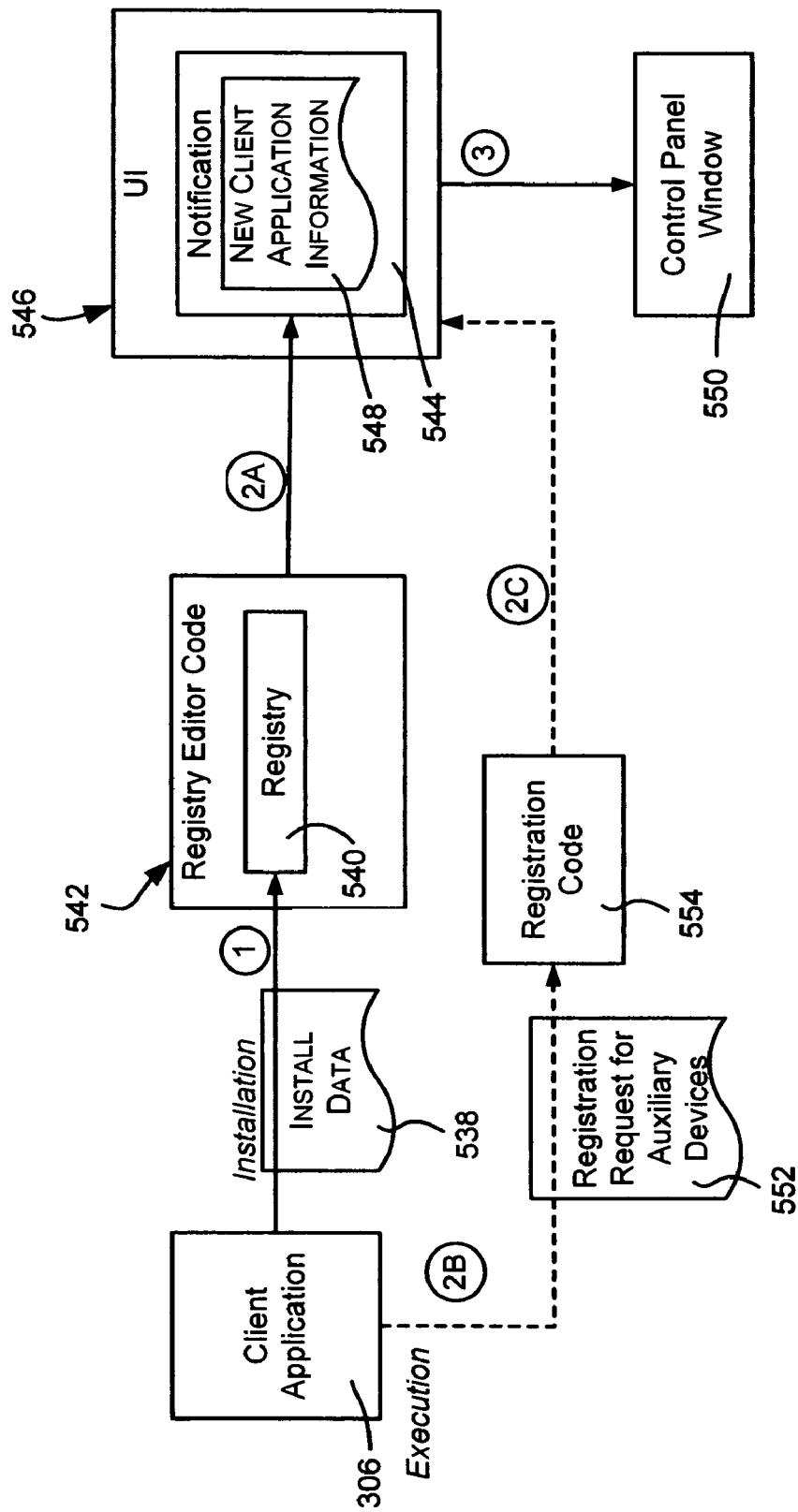
FIG. 5 is an example representation of installation-based or execution-based mechanisms for enabling an application to exchange data with a basic auxiliary display device, in accordance with an aspect of the present invention.

Turning to FIG. 5, a client application 306 may register itself during its initial installation on the main computer system. To this end, when the application 306 is installed, installation-related data 538 is written to the registry 540, as represented in FIG. 5 by the arrow labeled one (1). With respect to auxiliary display functionality, installation includes writing a specified set of auxiliary display-related registry keys during the regular install process of an application. An application specifies some important values at this point including its title, icon and supported endpoints. For example, a main registry key may be [HKCU|HKLM]\Software\Microsoft\Windows\AuxiliaryDisplay\Applications\<ApplicationID>, and reference an application ID in the form of a GUID that uniquely identifies the particular client application (and also represents the CLSID of the COM object implementing the IAuxiliaryDisplayApplication interface for lifetime management); a friendly name comprising a human-readable text string describing the name of the client application; an icon representing the client application (such as for display in the control panel and in the device's shell), most likely stored as a file name and resource ID; and a priority list of Endpoint IDs comprising the device application(s) to which this client application sends data. A maximum number may be enforced, and endpoints may be labeled numerically (Endpoint0, Endpoint1) so that the priority is clear. Also note that policy (e.g., from a system administrator) may overrule anything an application requests with respect to auxiliary displays, e.g., an application can be prevented from ever using a device.

The process of installation of an auxiliary display application makes the client application available on the auxiliary display control panel for the user to enable on devices. To this end, when the installation occurs, the user may be shown a notification; in FIG. 5, this is represented by the arrow labeled two-A (2A), where code 542 associated with the registry (e.g., registry editor code) indicates via a notification 544 to a user interface 546 that information 548 about the newly installed client application is available.

The user then is able to invoke a control panel window 550 or the like to allow the user to choose the auxiliary device or devices to connect to that client application, that is, to enable this client application 306 on any one of the user's auxiliary display device or devices, as represented in FIG. 5 by the arrow labeled three (3). Note that the notification 544 may provide instructions, a link, or similar information to assist the user in selecting the correct icon in the control panel window to enable the application for use with auxiliary displays. As described above, to facilitate selection, a table of checkboxes (permissions table) or the like may be provided to allow the user to select one or more auxiliary devices with which this newly-installed client application 306 is enabled.

As can be readily appreciated, the user is also able to use the control panel or similar mechanism to enable an application that has been previously installed but not enabled, disable a previously enabled application, change the device or devices on which an application is enabled, and so on. Thus, in FIG. 5, when a client application executes, it may or may not be enabled for use with one or more auxiliary devices, but if not enabled, may be able to do so when executed. For example, during a running application's registration request 552, (described below with reference to FIGS. 7 and 8), if not already enabled, registration code 554 may send the notification 544. At such a time, the user is able to decide on whether to enable the application for one or more auxiliary devices. The user may also decide to enable or disable the application for one or more auxiliary devices while the application is running; to the client application these changes will appear as "device added" and "device removed" events, respectively.

Note that in a described implementation, the user (or higher-level policy) always has control over which applications are allowed to send content to which devices. Although automatic enablement is feasible, it is undesirable from a security standpoint, and thus in this example implementation there is no programmatic way to enable a client application to operate with an auxiliary device during the installation process.

Once enabled, the client application 306 can call into the platform to register with user-authorized devices, and thereafter provide content to these authorized devices. Registration and communication are described below with reference to FIGS. 7-9. In keeping with various aspects of the present invention, the client application does not have to deal with the management of devices, because this work is taken care of by the platform. Instead, the client application may use the API set 304 (FIG. 3) to send content and notifications, as described below. Note that a client application may cache data on devices that support caching, such as to allow offline access, whereby the user is able to browse through content that has been cached on the device by the application. Note that in one implementation, for security reasons the application can send but cannot obtain content cached on the auxiliary device, and instead can only receive events from the auxiliary device, as described below. However it is straightforward to provide a system in which an application can read content cached on the auxiliary device.

Instead of (or in addition to caching), the application also may provide its content on demand, as the user requests it. In the on-demand scenario, when a user interacts with the client application via an auxiliary display, the platform requests the content to display from the application, receives it via the API set 304, and sends the content to the device. When the main computer system is online, the platform may also provide events to the application so that the application is aware of what the user is doing, e.g., the application receives events corresponding to user interaction commands with the auxiliary device.

Via the API set and simple content format for communicating content, the platform removes the need for the client application to have special knowledge about the various types of devices, their firmware, the communication channels and drivers that would be needed to typically render data on devices. In this way, the design allows the ISV to avoid dealing with the details of device management and wire protocols. Thus, the platform architecture including the API set allows ISVs to provide content to connected auxiliary display devices, particularly those that support the simple content format, which allows client applications to provide data capable of being rendered on any compliant device. As described below, this format provides for basic text and image layout as well as menus and dialogs. The platform also exposes device capabilities, in case ISVs choose to customize content (e.g., provide different content based on color support).

Moreover, devices may support more than the simple content format, and, for example, may support additional endpoints (extended data formats) for calendar (e.g., vCalendar), contact information (e.g., vcard), or any other format that a device can understand. Device-supported data formats are limited only by the device; client applications running on the main computer system can use the auxiliary display platform to communicate with auxiliary displays using any mutually-understood data format.

To summarize, the auxiliary display API set 304 (FIG. 3) enables authorized client applications running on the main computer system to send content and notifications for rendering data on auxiliary display devices. The platform provides device connection and management, and the system control panel provides for user control of auxiliary display settings. The APIs allow applications to send content and notifications to devices, as well as to receive events from devices. This architecture allows for extensibility at different levels, including that the platform and API set abstract ISV applications from having to understand specific properties of each auxiliary display device. Device capabilities are exposed only if requested. Further, the auxiliary display platform is connection agnostic, in that it is irrelevant to the application how the auxiliary display is connected, which may be via essentially any connection and/or protocol, e.g., USB, Bluetooth, TCP/IP and so forth, including future protocols, as long as the appropriate user mode auxiliary display transport driver is present.

As mentioned above, a client application communicates with a device using what is referred to as an endpoint. An endpoint specifies a destination for communication (e.g., a calendar device application) and a contract for the data (e.g., the vCalendar format) that is passed between the application and the endpoint. In this model, applications specify endpoints with which they can communicate, while devices specify endpoints that they support. Communication is then established by the platform between devices and applications that support the same endpoint.

An endpoint is represented by a unique identifier (e.g., a GUID) used by the main computer system when communicating with the device. Each device application on the device can advertise one or more endpoints which can accept data from the main computer system. Endpoints are considered well-known items that are consistent across devices. An endpoint specifies the data format which is used to communicate data to and from the main computer system; the client application is responsible for formatting the data properly for the endpoints it communicates with as part of the endpoint contract. Examples of endpoints include the simple content renderer (data format is the simple content format), a calendar renderer (data format is iCal) and a notification engine.

Figure 6:
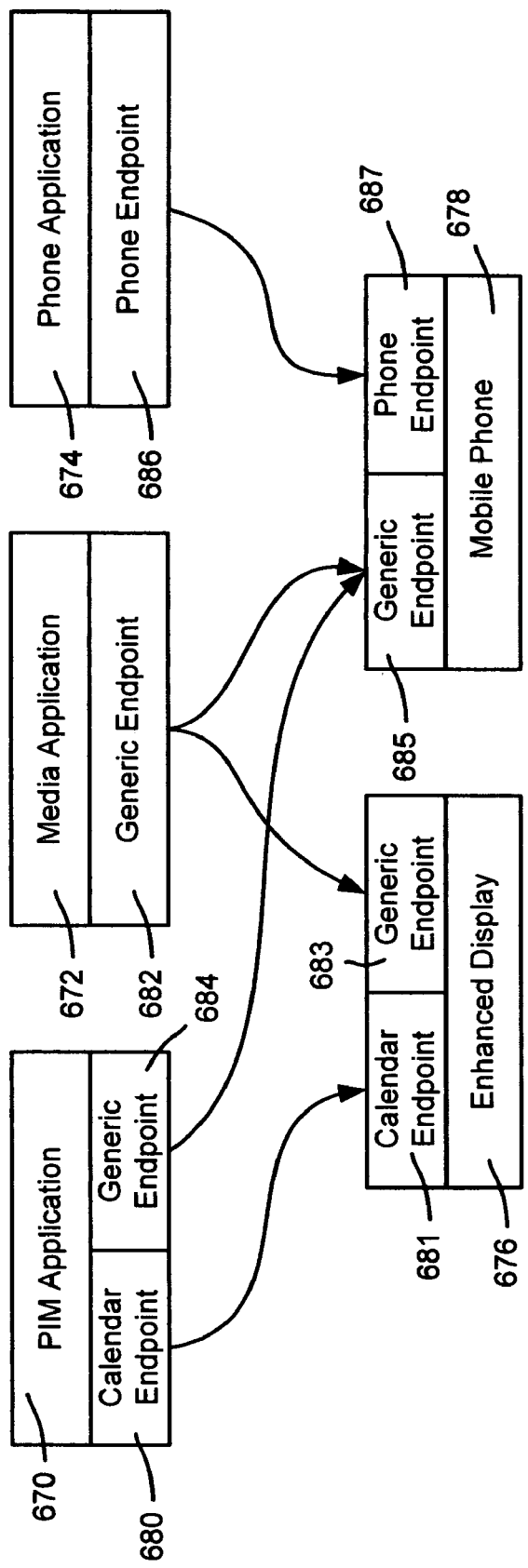
FIG. 6 is an example representation of endpoints by which an auxiliary-aware client application exchanges data with various auxiliary display device applications, in accordance with an aspect of the present invention.

FIG. 6 illustrates how different example client applications, including a personal information manager (PIM) application 670, a media application application 672 and phone application application 674 may communicate with example devices, comprising an enhanced display 676 and a mobile phone 678. Applications provide data for an endpoint, and the platform uses the endpoint to determine to which device or devices to convey the data. Thus, in the example of FIG. 6, the PIM application 670 specifies calendar endpoint data 680, consumed as a copy 681 of the data by the enhanced display 676, which also consumes generic endpoint data from the media application 672, as represented via blocks 682 and 683. The mobile phone 678 consumes generic data from the PIM application 670 and the application 672, represented via blocks 682, 684 and 685. The mobile phone 678 also consumes phone endpoint data as represented via blocks 686 and 687. Although not shown in the examples of FIG. 4, other examples of endpoints that may be supported include e-mail and contact data.

Although not necessary to the present invention, certain content identifiers may be reserved for specific content. For example, top-level application "glance" information is reserved (as Content ID "0" metadata) in each client application's Content ID namespace to signify the data to be displayed as the top-level glance information for that application. The glance information is typically succinct data, deemed by the application to be highly important, for displaying on the main menu of a device, (although for a single-line display, this may be the only content displayed). For example, for an email renderer, top-level application glance information might be "7 Unread Messages," while for a calendar application, the top-level application glance information may describe the time and location of the next appointment. Enforcement of glance information formatting by the API is feasible, e.g., the data may need to be provided as a Unicode, null-terminated string to be accepted.

Figure 7:
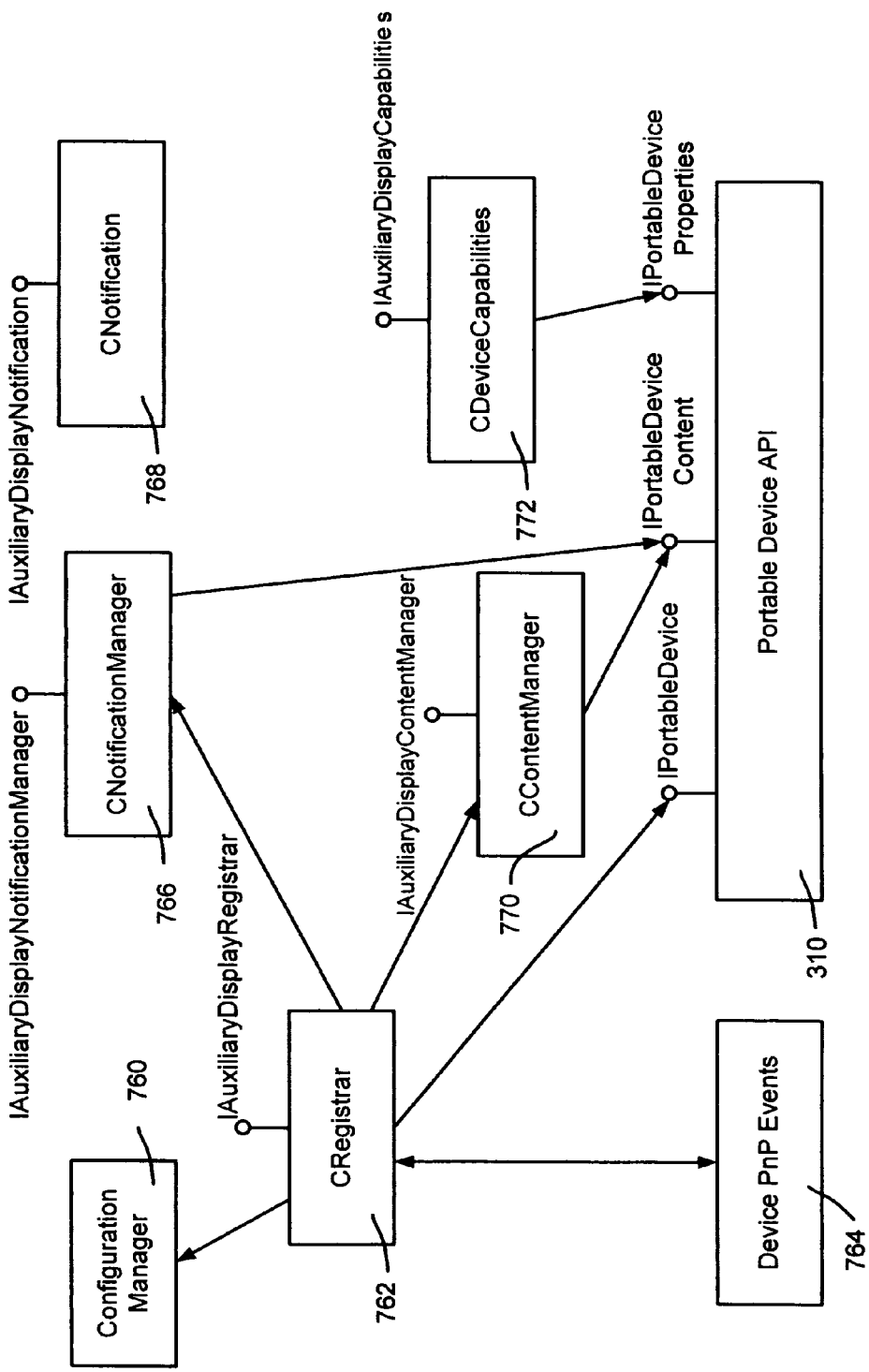
FIG. 7 is a block diagram generally representing objects of an API set, which client applications call to exchange data with the firmware of auxiliary display devices in accordance with an aspect of the present invention.

In one implementation, as generally represented in FIG. 7, the public client API set 304 is implemented in unmanaged code comprising a set of COM interfaces. Client applications create an instance of one or more of the objects/interfaces in their process, and then use those objects to communicate with the auxiliary display platform. A general architecture diagram showing the major classes and the interfaces they implement is shown in FIG. 7; note that each COM object also provides an IUnknown interface, omitted from FIG. 7 for purposes of clarity.

The configuration manager 760 comprises a shared internal component for handling device and application configuration information. The CRegistrar class (object) 762 implements the IAuxiliaryDisplayRegistrar interface, as well as the AuxiliaryDisplayRegistrar CoClass. The CRegistrar class 762 maintains a list of IPortableDevice interface pointers corresponding to devices which are in use by the API instance. This list is populated on a Register or RegisterNotifications call, and can be added to and removed from at any time. The CRegistrar class 762 listens to PnP device events 764 to determine when devices are added/removed from the system, and updates its local list appropriately, as well as notifying any existing clients (CNotificationManager or CContentManager objects) which are impacted by the change. The CRegistrar class 762 is also responsible for the application and device permission checks to determine whether an application is authorized to use a device, using the shared Configuration Manager library as an interface into this data. A list of instantiated objects (CNotificationManager or CContentManager) is maintained; these objects only go away when all references to themselves and CRegistrar go away (that is, when the API is unloaded).

The CNotificationManager class/object 766 implements the IAuxiliaryDisplayNotificationManager interface. When the CNotificationManager class 766 is created, an Application identifier (ID) is associated with the instance, and it is not changed. The CRegistrar object 762, which instantiates the CNotificationManager object 766, passes in one IPortableDeviceContent pointer corresponding to each device that is enabled for notifications. Subsequent changes to this list of devices are effected by similar method calls from the CRegistrar object 762 throughout the life of the object. There may be internal metadata stored to track cookies provided back to the calling application when displaying notifications. The CNotificationManager class/object 766 is responsible for taking IAuxiliaryDisplayNotification objects, extracting the data, and sending it to each device using the IPortableDeviceContent interface of the portable device API 310. Because notifications are treated consistently across devices, the same operation may be repeated for each known device.

The CNotification class 768 is a data container. It implements the IAuxiliaryDisplayNotification interface, as well as the AuxiliaryDisplayNotification CoClass (so a client can CoCreate an instance).

The CContentManager class/object 770 implements the IAuxiliaryDisplayContentManager interface. It is created by the CRegistrar class 762 in response to a Register method call. The CContentManager class/object 770 needs to be initialized with the Application ID and Endpoint ID which were passed to Register, and these are not changed once they are set. The CRegistrar object 762 is responsible for consulting the configuration table to determine which devices are enabled for a particular application/endpoint pair. It then passes CContentManager an IPortableDeviceContent interface pointer for each matched device. Subsequent device additions/removals will use the same mechanism to communicate changes to the CContentManager object 770. Additionally, for each device interface stored locally, the CContentManager object 770 stores a corresponding CDeviceCapabilities object 772 (or IAuxiliaryDisplayCapabilities interface). This is an optimization in anticipation of frequent need for this object.

Methods are provided in the CContentManager object 770 for adding content, removing specific content, or removing all content. To this end, an Add method call queries the incoming IAuxiliaryDisplayContent interface to get the values for some of the properties applicable to the call, and then based on the result, iterates through the devices, requests content from the client application, and sends the content down to the device. A remove call attempts to remove a specific piece of content from each device. Another method deals with setting up the event sink; an IAuxiliaryDisplayEvents interface pointer passed in by the client application is stored, and used for notifying the application on various events. The device events are triggered in response to events coming in from the CRegistrar object 762. The CContentManager class 770 may implement the IPortableDeviceEventCallback interface, and the CRegistrar object 762 may register for events; the CContentManager 762 is then responsible for parsing and delegating those events appropriately.

The CDeviceCapabilities class 772 implements the IAuxiliaryDisplayCapabilities interface. These are created by the CContentManager object 770 to coincide with each device on which it displays content. Internally, it has a reference to the IPortableDeviceProperties interface, so it is able to query device properties directly from the device. Device capabilities may include whether the device has a cache, a screen type (e.g., bitmap, text or one-line display), screen width, screen height, color depth, color type (e.g., color, grayscale, black and white), and so forth.

Figure 8:
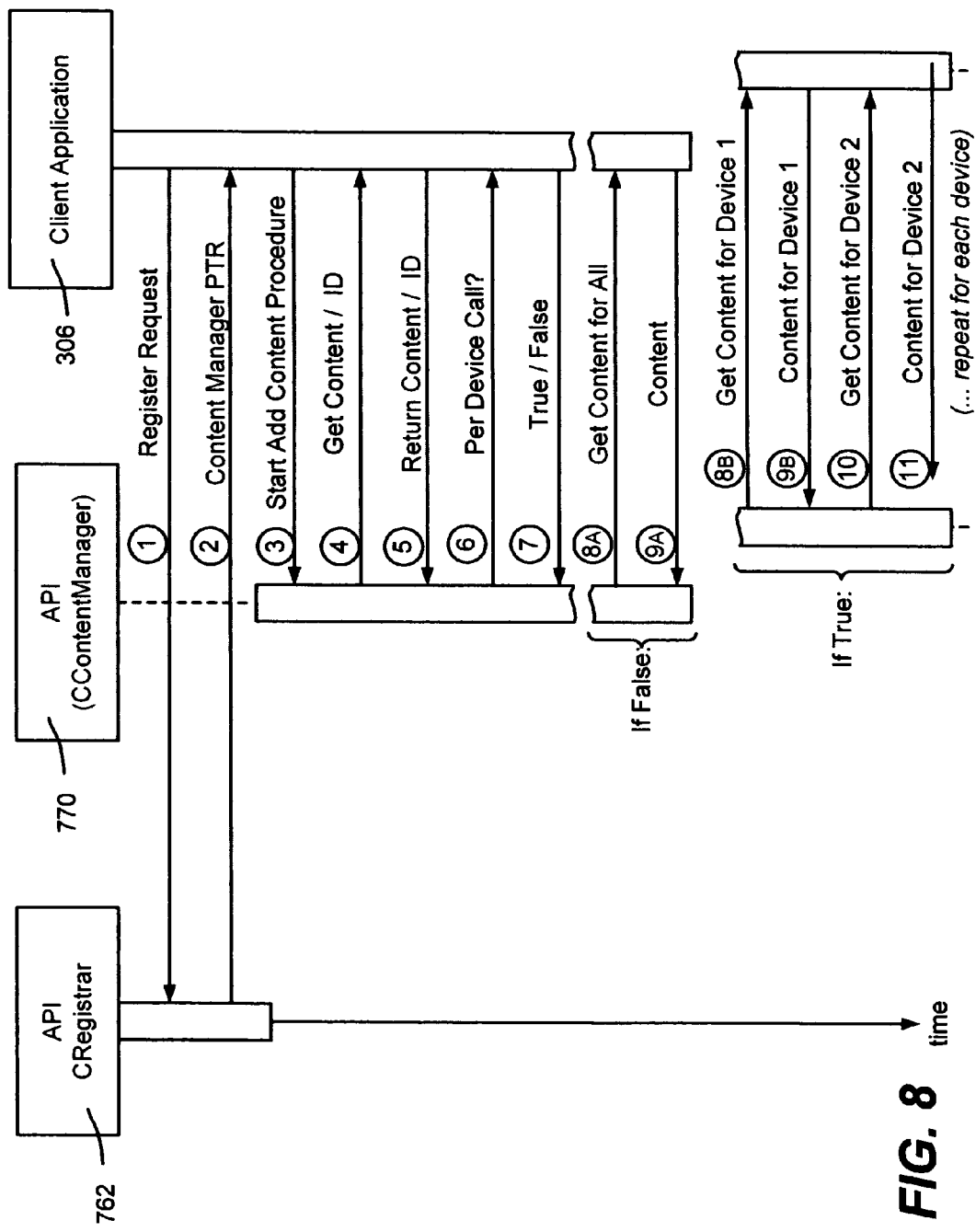
FIG. 8 is a sequence diagram generally representing registration, calls and callbacks between a client application and API objects to obtain content from the application for communicating to one or more auxiliary display devices, in accordance with an aspect of the present invention.

FIG. 8 describes how an application 306 works with the CRegistrar and CContentManager objects (762 and 770 of FIG. 7, respectively) in order to add content to a device. In general, when a client application 304 that wants to use an auxiliary display starts up on the main computer system, (or at some other appropriate time), the application registers with the auxiliary display platform via a register request to the CRegistrar object 762. A successful registration returns an instance (e.g., as a pointer) of the content management interface to the application. This is generally represented in FIG. 8 via the arrows labeled one (1) and two (2).

To add content to devices, the application 304 implements an interface that the platform may use to acquire metadata about the content and the content body. This is a pull model, where the platform pulls data from the application. To add content, the application starts the procedure by calling a method on the CContentManager object 770, passing a pointer to an object encapsulating the content, as generally represented in FIG. 8 via the arrow labeled three (3). The CContentManager object 770 then calls back into that encapsulating object to retrieve the content and send it to connected devices. While some devices may cache the data, others might not (e.g., due to no cache, a low memory condition, and so forth); thus, the application may be notified via an event to resend the data. Each piece of content has a unique ID (within the scope of the application), and the device and platform refer to the piece of content by this ID. These operations are generally represented in FIG. 8 via the arrows labeled four (4) and five (5).

When an application adds data, the application may be sending this data to multiple devices. As different devices have different characteristics, in some cases an application can decide to specialize content per device. This is specified in the content metadata, as generally represented in FIG. 8 via the arrows labeled six (6) and seven (7). If an application specifies that it is interested in getting called for the content once by the platform for all devices, the application specifies that per device calls are not wanted, e.g., via the True/False data, namely via a False response. The arrows labeled eight-A (8A) and nine-A (9A) show the operations when content for all (False) is specified.

Alternatively, the arrows labeled eight-B (8B) and nine-B (9B) show the operations when the application wants to be called back for each device separately (a True response) to provide content based on the device characteristics. When this occurs, the request and get content process is repeated (e.g., the arrows labeled ten (10) and eleven (11)) for each device for which the application is authorized to send content.

As represented in FIG. 4, a lifetime manager 434 may be provided to listen to changes in the activation status of client applications and devices, and notify client applications. Client applications are started by co-creating the registered class in a different process, and then calling the StartUp method with the appropriate parameters. Applications may implement the API set that provides lifetime-related functionality for auxiliary display applications. A component of the platform is responsible for starting and stopping the application, based on the set of connected devices. Alternatively, an application may manage its own lifetime; the application gets notified when devices are connected or disconnected, and often may be running when it has no devices to provide content to.

As represented in FIG. 4, the client process is started (unless already running) by the lifetime manager 434. The client process is responsible for the logic associated with managing the client application and its content on the devices, and is the main computer system's counterpart to a device application running on an auxiliary display device. As described above, the client application 306 initiates communication with the auxiliary display platform by registering with the platform. This call loads up the auxiliary display client API, as well as the portable device API, into the address space of the client process. The portable device API handles communication across the process boundary to the drivers that connect to the auxiliary display devices.

The driver processes are created by the user mode driver framework process. The drivers expose a device driver interface with which the portable device API communicates. The client API will not interact directly with these processes. When a client application is installed, it specifies an Application Id, which is a GUID. This Application Id should be the CLSID of the COM component implementing the IAuxiliaryDisplayApplication interface. The lifetime manager 434 uses the Application Id to CoCreate an out-of-proc COM server instance of the client application. It calls methods on the IAuxiliaryDisplayApplication interface indicating when the client application has at least 1 device to talk to (startup), and also when there are no devices to talk to (shutdown). Furthermore, to be robust in the face of application crashes, a heartbeat method may be used to check whether an application is still running.

Note that it is up to the ISV to CoCreate an instance of IAuxiliaryDisplayRegistrar in their own process to communicate with the API set 304. This approach allows the isolation of applications from each other, while maintaining the benefit of running the API in the application's process.

An application can support multiple content formats, however each instance of the client API (IAuxiliaryDisplayContentManager) only supports a single content format. As described above, when an application is installed, it provides a priority ordered list of endpoints which it supports. Internally, a mapping is done between device-exposed endpoints and application-preferred endpoints to obtain an optimal matching of content formats for devices. Basically, the highest priority content format is chosen when available, by going down the list until a match is found. The control panel shows a checkbox if there is any common endpoint between the application and the device. The client API determines the actual endpoint used at runtime, however, as the list may change. The client application calls IAuxiliaryDisplayRegistrar::Register once for each endpoint it supports; the application gets one IAuxiliaryDisplayContentManager interface for each content format. In one current implementation, each device only receives content from at most one of these interfaces. Thus, an application can have one central data source, talking to multiple API interfaces, which talk to multiple devices, each supporting a different content format. This approach maintains the isolation within the API which makes it clean and simple to use, while allowing the ISV to support multiple content formats in an intuitive manner. In the control panel, each application may appear as a single line regardless of how many content formats it supports.

Turning to an explanation of notifications that may be sent by an application to an auxiliary device, the platform supports the display of notifications (or alerts) on the auxiliary display. For example, notifications for important events such as meeting reminders, e-mail alerts, a buddy logging on, system alerts, and so forth may be sent for display on the auxiliary display device. In one implementation, notifications typically appear in real-time on top of any existing device applications, and provide the user a way to dismiss them (prior to automatic expiration). Notifications sent to the auxiliary display platform may contain a title, a message body, and icon, and are associated with an expiration time. The expiration time (e.g., an absolute or relative time) provides guidance to a device as to when it can remove the notification if the user has not interacted with it.

Notifications may generally use the same notification API from the perspective of the application 306 regardless of device capabilities. Thus, a title, text and optional information such as images, icons, controls (e.g., buttons), menus and so forth may be specified as parameters. Devices not capable of graphics will have the information stripped of anything other than the text, and even the text may be modified to fit a particular device display, such as by alternating lines over time. Note that content may generally be downloaded to a cache on the enhanced device, or downloaded on demand, and the device itself will then handle the content as desired. This allows having multiple client applications running on the system being able to provide content, with one device application being run at a time on the auxiliary display. Notifications will impose on the current running device application, by design. Notifications may be arranged for presentation in any suitable ordering, such as in a FIFO (first-in first-out) manner, although as can be readily appreciated, there may be a different priority among types of notifications (e.g., an urgent, recent or otherwise-flagged notification may be given a higher priority than a regular or old notification).

Figure 9:
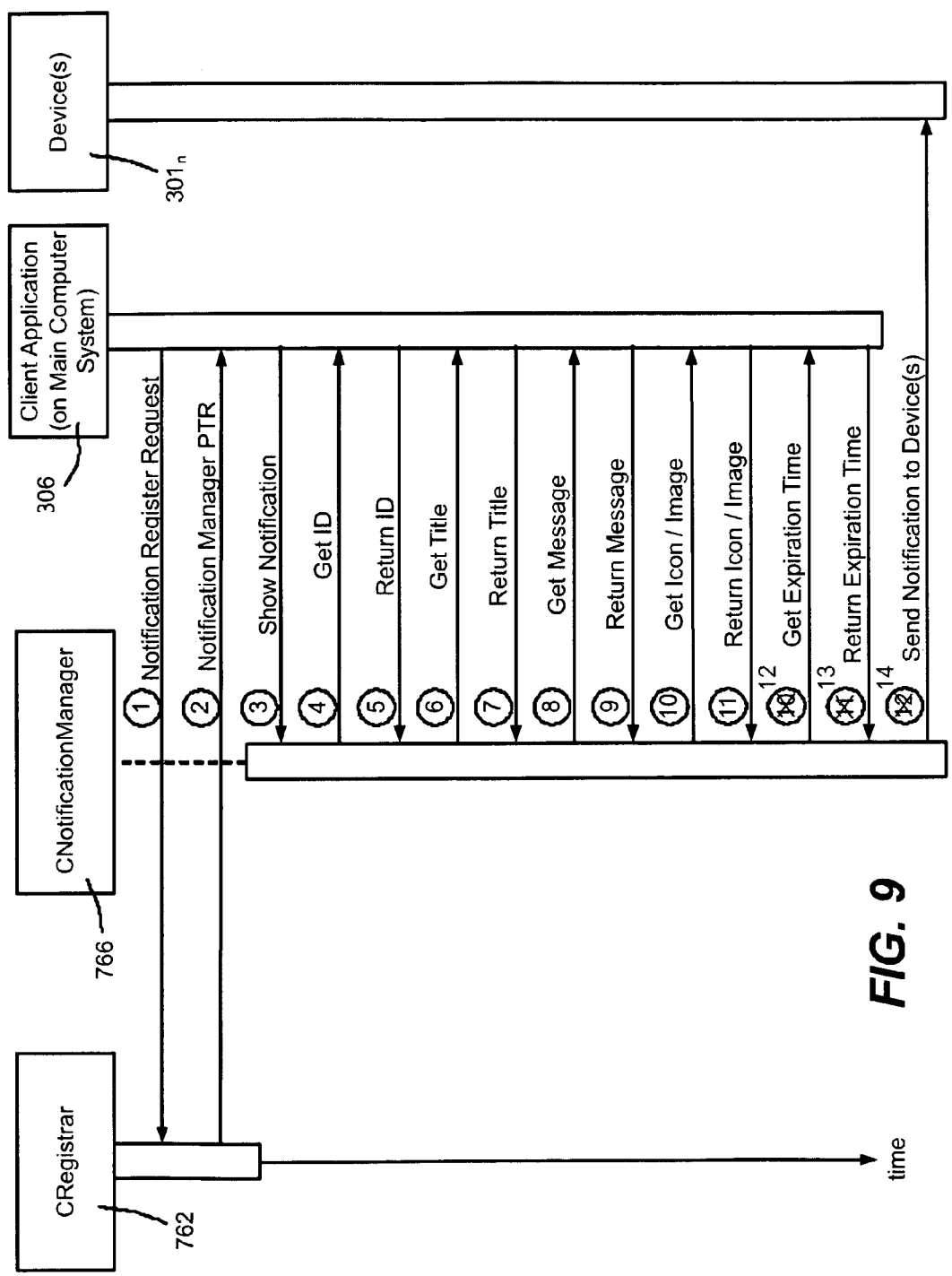
FIG. 9 is a sequence diagram generally representing registration, calls and callbacks between a client application and API objects to obtain notification data from the application for communicating to one or more auxiliary display devices, in accordance with an aspect of the present invention.

FIG. 9 describes how a client application 306 works with the CRegistrar object 762 and CNotificationManager object 766 in order to send a notification to one or more devices 301n with n representing a positive integer number to indicate individual devices). In general, when an application 304 wants to send a notification to an auxiliary display, the application registers for notifications via a RegisterNotifications request to the CRegistrar object 762. A successful registration returns an instance (e.g., as a pointer) of the CNotification-Manager object 766 to the application. This is generally represented in FIG. 9 via the arrows labeled one (1) and two (2).

The application 306 starts the procedure by calling a method on the CNotificationManager object 766, as generally represented in FIG. 8 via the arrow labeled three (3). The CNotificationManager object 766 then calls back to the application 306 (or a CNotification object 768 specified by the application as in FIG. 7) to obtain an identifier for the notification, as generally represented in FIG. 9 via the arrows labeled four (4) and five (5). Subsequent callbacks for the title, message (text), icon/image and expiration time are then made, as generally represented in FIG. 9 via the arrows labeled six (6) through thirteen (13).

With this information, the CNotificationManager object 766 sends the notification to the connected device or devices, as generally represented in FIG. 9 via the arrow labeled fourteen (14). In one current implementation, every device with which the application is authorized to communicate receives the notification, however it is feasible to have an alternative mechanism in which the client application can selectively specify that only certain ones of its authorized devices receive the notification. It is also feasible to have a mechanism in which differently-formatted notification information is sent to different types of devices (similar to the per-device content differentiation mechanism generally described with reference to FIG. 8).

In addition to sending notifications, an application can similarly request revoking of a notification, or revoking all of its notifications. For example, a user may dismiss a notification on the main computer system, and the application may decide that the notification should be revoked from an auxiliary device or devices.

With respect to events, the application can specify an interface for receiving a variety of types of events from the platform. The platform sends events related to devices to appropriately authorized applications, based on the control panel configuration table or the like. Events may include event notifications for device addition and removal or connection and disconnection (including wireless out-of-range, device crashing), and events in response to queries for properties of connected devices such as screen size, color depth, data cache presence and so forth. The eventing mechanism also provides for notification events for key presses, and extends to custom endpoints. A content-request event is also generated when an auxiliary device needs a piece of content that is not readily available to it.

Applications on the auxiliary device are also capable of generating events, such as device navigation events (e.g., content is missing, a refresh is needed and so forth), selection events (user presses a button in a dialog, selects a displayed icon, dismisses a notification and so forth), and context menu actions. Other events may be pre-emptive, e.g., a device playing track seven of an audio application may anticipate that track eight's data is needed and send a request for the data in advance. Auxiliary device application-generated events propagate back to the client application running on the main computer system (when online).

The semantics and content of the events are defined by the endpoint. In general, the event identifies the device from which it came, the device application/endpoint from which it came, and data that accompanies the event. For example (using the simple content format endpoint), when a user navigates from one piece of content to another, a navigation event is sent back to the main computer system to report what the user did. The application can choose to respond to this event in a suitable manner.

Interfaces and Summary

Definitions of common types that are used throughout the API set are set forth below:

```
typedef GUID          APPLICATION_ID;
typedef GUID          ENDPOINT_ID;
typedef GUID          DEVICE_ID;
typedef REFGUID REFAPPLICATION_ID;
typedef REFGUID REFENDPOINT_ID;
typedef REFGUID REFDEVICE_ID;
typedef ENDPOINT_ID            *PENDPOINT_ID;
typedef APPLICATION_ID         *PAPPLICATION_ID;
typedef DEVICE_ID              *PDEVICE_ID;
typedef unsigned long          CONTENT_ID;
typedef CONTENT_ID             *PCONTENT_ID;
typedef unsigned long          NOTIFICATION_ID;
typedef NOTIFICATION_ID        *PNOTIFICATION_ID;
```

The following contains one example of an interface definition file for the auxiliary display platform (the interfaces are described above, and are generally summarized below):

```
//----------------------------------------------------------------
// <see copyright disclaimer>
//
// Module:
//       AuxiliaryDisplay.idl
//
// Description:
// This is the interface definition file for the Auxiliary Display
// API. It defines the public interfaces used by ISVs.
//
//----------------------------------------------------------------
import "oaidl.idl";
import "propidl.idl";
```

-continued

```
// Include Auxiliary Display types not defined in the IDL
#include "AuxiliaryDisplayTypes.h"
// Forward-declare the interfaces in this file
interface IAuxiliaryDisplayContentManager;
interface IAuxiliaryDisplayNotificationManager;
interface IAuxiliaryDisplayNotification;
interface IAuxiliaryDisplayContent;
interface IAuxiliaryDisplayEvents;
interface IAuxiliaryDisplayCapabilities;
[
    object,
    uuid(c07d3735-5d3f-423a-a4a4-4dbf023236e6),
    helpstring("IAuxiliaryDisplayApplication Interface"),
    pointer_default(unique)
]
interface IAuxiliaryDisplayApplication : IUnknown
{
    HRESULT Startup(
        [in]    REFAPPLICATION_ID in_applicationId
        );
    HRESULT Shutdown(
        [in]    REFAPPLICATION_ID in_applicationId
        );
    HRESULT KeepAlive(
        [in]    REFAPPLICATION_ID in_applicationId
        );
};
[
    object,
    uuid(e22331ee-9e7d-4922-9fc2-ab7aa41ce491),
    helpstring("IAuxiliary Display/Registrar Interface"),
    pointer_default(unique)
]
interface IAuxiliaryDisplayRegistrar : IUnknown
{
    HRESULT Register(
        [in]    REFAPPLICATION_ID in_applicationId,
        [in]    REFENDPOINT_ID in_endpointId,
        [out]   IAuxiliaryDisplayContentManager ** out_ppIContent
        );
    HRESULT RegisterNotifications(
        [in]    REFAPPLICATION_ID in_applicationId,
        [out]   IAuxiliaryDisplayNotificationManager **
out_ppINotification
        );
};
[
    object,
    uuid(63cea909-f2b9-4302-b5e1-c68e6d9ab833),
    helpstring("IAuxiliaryDisplayNotificationManager Interface"),
    pointer_default(unique)
]
interface IAuxiliaryDisplayNotificationManager : IUnknown
{
    HRESULT Show(
        [in]    IAuxiliaryDisplayNotification * in_pINotification
        );
    HRESULT Revoke(
        [in]    const NOTIFICATION_ID in_notificationId
        );
    HRESULT RevokeAll( );
};
[
    object,
    uuid(03c93300-8ab2-41c5-9b79-46127a30e148),
    helpstring("IAuxiliaryDisplayNotification Interface"),
    pointer_default(unique)
]
interface IAuxiliaryDisplayNotification : IUnknown
{
    [propget]
    HRESULT NotificationId(
        [out, retval]           PNOTIFICATION_ID out_pNotificationId
        );
    [propput]
    HRESULT NotificationId(
        [in]                    NOTIFICATION_ID in_notificationId
        );
    [propget]
```

-continued

```
        HRESULT Title(
            [out, string, retval]       LPWSTR * out_ppwszTitle
            );
        [propput]
        HRESULT Title(
            [in, string]                LPWSTR in_pwszTitle
            );
        [propget]
        HRESULT Message(
            [out, string, retval]       LPWSTR * out_ppwszMessage
            );
        [propput]
        HRESULT Message(
            [in, string]                LPWSTR in_pwszMessage
            );
        [propget]
        HRESULT Image(
            [out, retval]               HICON * out_phIcon
            );
        [propput]
        HRESULT Image(
            [in]                        HICON in_hIcon
            );
        [propget]
        HRESULT ExpirationTime(
            [out, retval]               SYSTEMTIME * out_pTime
            );
        [propput]
        HRESULT ExpirationTime(
            [in, unique]                SYSTEMTIME * in_pTime
            );
};
[
    object,
    uuid(a5d5b66b-eef9-41db-8d7e-e17c33ab10b0),
    helpstring("IAuxiliaryDisplayContentManager Interface"),
    pointer_default(unique)
]
interface IAuxiliaryDisplayContentManager : IUnknown
{
    HRESULT Add(
        [in]    IAuxiliaryDisplayContent * in_pIContent
        );
    HRESULT Remove(
        [in]    const CONTENT_ID in_contentId
        );
    HRESULT RemoveAll( );
    HRESULT SetEventSink(
        [in, unique]    IAuxiliaryDisplayEvents * in_pIEvents
        );
    HRESULT GetDevices(
        [out]   DWORD * out_pdwNumDevices,
        [out, size_is(,*out_pdwNumDevices)]
IAuxiliaryDisplayCapabilities ** out_ppIDevices
        );
};
[
    object,
    uuid(c18552ed-74ff-4fec-be07-4cfed29d4887),
    helpstring("IAuxiliaryDisplayContent Interface"),
    pointer_default(unique)
]
interface IAuxiliaryDisplayContent : IUnknown
{
    HRESULT GetContent(
        [in, unique]
IAuxiliaryDisplayCapabilities * in_pICapabilities,
        [out]                           DWORD * out_pdwSize,
        [out, size_is(,*out_pdwSize)]   BYTE ** out_ppbData
        );
    [propget]
    HRESULT ContentId(
        [out]   PCONTENT_ID out_pcontentId
        );
    [propget]
    HRESULT DifferentiateContent(
        [out]   BOOL * out_pfDifferentiateContent
        );
};
```

-continued

```
[
    object,
    uuid(61feca4c-deb4-4a7e-8d75-51f1132d615b),
    helpstring("IAuxiliaryDisplayEvents Interface"),
    pointer_default(unique)
]
interface IAuxiliaryDisplayEvents : IUnknown
{
    HRESULT ContentMissing(
        [in]    const CONTENT_ID in_contentId,
        [out]   IAuxiliaryDisplayContent ** out_ppIContent
        );
    HRESULT ApplicationEvent(
        [in]    IAuxiliaryDisplayCapabilities * in_pICapabilities,
        [in]    const DWORD in_dwEventId,
        [in]    const DWORD in_dwEventSize,
        [in, size_is(in_dwEventSize)] const BYTE * in_pbEventData
        );
    HRESULT DeviceAdded(
        [in]    IAuxiliaryDisplayCapabilities * in_pIDevice
        );
    HRESULT DeviceRemoved(
        [in]    IAuxiliaryDisplayCapabilities * in_pIDevice
        );
};
[
    object,
    uuid(535e1379-c09e-4a54-a511-597bab3a72b8),
    helpstring("IAuxiliaryDisplayCapabilities Interface"),
    pointer_default(unique)
]
interface IAuxiliaryDisplayCapabilities : IUnknown
{
    HRESULT GetCapability(
        [in]              REFPROPERTYKEY in_keyCapability,
        [in, out]         PROPVARIANT * out_pValue
        );
};
//--------------------------------------------------------
//--------------------------------------------------------
[
    uuid(d5cf4a1e-69af-4f68-894a-8b54985253ee),
    version(1.0),
    helpstring("Microsoft ® AuxiliaryDisplayApi Type Library 1.0")
]
library AuxiliaryDisplayApiLib
{
    importlib("stdole2.tlb");
    [
        uuid(e20543b9-f785-4ea2-981e-c4ffa76bbc7c),
        helpstring("AuxiliaryDisplayRegistrar Class")
    ]
    coclass AuxiliaryDisplayRegistrar
    {
        [default] interface IAuxiliaryDisplayRegistrar;
    };
    [
        uuid(0ce3e86f-d5cd-4525-a766-1abab1a752f5),
        helpstring("AuxiliaryDisplayNotification Class")
    ]
    coclass AuxiliaryDisplayNotification
    {
        [default] interface IAuxiliaryDisplayNotification;
    };
};
```

The IAuxiliaryDisplayApplication interface is used by the lifetime manager to create and interact with a client application. The ISV is responsible for implementing this interface in their client application if they wish to use lifetime management. The HRESULT Startup(REFAPPLICATION_ID in_applicationId) method is called to signal that the client application should begin communicating with devices. It signifies that there are one or more devices to which the given application is able to send data. The first parameter is the application ID of the application to be started, and is included in case the same COM object handles data for multiple applications. The HRESULT Shutdown(REFAPPLICATION_ID in_applicationId) method is called to signal that the client application should stop communicating with devices. After the Shutdown call, the lifetime manager releases references to the client application, and (ideally) the application closes down. The HRESULT KeepAlive(REFAPPLICATION_ID in_applicationId) method is used as a heartbeat. Every so often, the lifetime manager will call it and expect to receive an S_OK response. If the call (e.g., remote procedure call or RPC) times out, or the call fails for some other reason, the application will be restarted.

As described above, the IAuxiliaryDisplayRegistrar interface is used by the ISV's client application to initiate a "session" with the auxiliary display subsystem. The ISV's application CoCreates an instance of this class, and calls the Register method to get an IAuxiliaryDisplayContentManager interface which it can then use to provide content to the devices. The interfaces returned are valid for the lifetime of the client application. Devices may come and go behind the scenes, with management performed by the platform. As described above, it is the API internals that determine whether applications are authorized to talk to devices; should an application not be authorized to talk to a device, in one implementation the interface is still returned, however it will not send data to any devices (and GetDevices returns 0). The HRESULT Register(REFAPPLICATION_ID in_applicationId, REFENDPOINT_ID in_endpointId, IAuxiliaryDisplayContentManager  out_pContent) method registers the ISV's application with the auxiliary display subsystem and enables the client application to send content to devices. The first parameter is the Application ID, which uniquely identifies the application, e.g., represented by a GUID. The second parameter is a GUID representing the endpoint on the device with which the application wishes to communicate. This is provided so that the ISV's application can support multiple endpoints (content formats), as each endpoint corresponds to a single type of content. Note that the ISV's application uses a different IAuxiliaryDisplayContentManager interface for each content format it wishes to send. A third parameter is an out parameter containing the interface the ISV's application uses to send content. The HRESULT RegisterNotifications (REFAPPLICATION_ID in_applicationid, IAuxiliaryDisplayNotificationManager  out_pNotification) method allows the ISV application to register itself as an application that provides notifications to the auxiliary displays. The ISV application provides its application ID, and gets back a pointer to the IAuxiliaryDisplayNotificationManager interface of the CNotificationManager object 766, which is then used to manage notifications in the subsystem.

The IAuxiliaryDisplayNotificationManager interface allows the ISV application to show and hide notifications on auxiliary displays. The HRESULT Show(IAuxiliaryDisplayNotification * in_pNotification) method causes a notification to be shown on the connected authorized auxiliary devices that support notifications. The parameter is an instance of a class that implements the IAuxiliaryDisplayNotification interface. That interface essentially contains of the relevant pieces necessary to show a notification. The HRESULT Revoke(const NOTIFICATION_ID in_notificationId) method allows the ISV application to cancel a single notification on all appropriate devices. The parameter comprises a cookie which was returned from the call to Show, as described above. The notification is only removed if it is currently being displayed or is pending (either a delayed notification or blocked by another notification). The HRESULT RevokeAll( ) method allows the ISV to remove all pending notifications.

The IAuxiliaryDisplayNotification interface provides methods to store and retrieve the key pieces of a notification. The [propget] HRESULT NotificationId(PNOTIFICATION_ID in_pnotificationId) and [propput] HRESULT NotificationId (NOTIFICATION_ID in_notificationId) methods allow the API/ISV to set/retrieve the notification ID. The default value is 0. This value uniquely identifies the notification within the application. The [propget] HRESULT Title (LPWSTR * out_ppwszTitle) and [propput] HRESULT Title (LPWSTR in_pwszTitle) methods allow the API/ISV to set/retrieve the current title of the notification. There may be a default value (e.g., "Notification"). The [propget] HRESULT Message(LPWSTR * out_ppwszMessage) and [propput] HRESULT Message(LPWSTR in_pwszMessage) methods allow the API/ISV to set/retrieve the current message body of the notification. This is the bulk of the message displayed to the user. The [propget] HRESULT Image(HICON * out_phIcon) and [propput] HRESULT Image(HICON in_hIcon) methods allow the API/ISV to set/retrieve an image that is displayed as part of the notification. The image will be scaled to fit based on the device, and may be provided in a standard format. The [propget] HRESULT ExpirationTime(PSYSTEMTIME out_pExpirationTime) and [propput] HRESULT ExpirationTime(PSYSTEMTIME in_pExpirationTime) methods allow the API/ISV to set/retrieve the time at which a notification should expire. The default value is '0', indicating the notification will never expire (and the user needs to dismiss it). In one implementation, the time is specified as an absolute time; the notification will self-destruct at the expiration time regardless of whether it has been displayed. It is up to the firmware on the device or driver to properly honor the expiration time.

The IAuxiliaryDisplayContentManager interface is the interface that allows the ISV to send content to the auxiliary displays. This interface is generic and accepts content of any type destined for any endpoint, however each specific instance of this interface accepts only content for a single endpoint (and thus a single type). The HRESULT Add(IAuxiliaryDisplayContent * in_pContent) method allows the ISV to add content to the cache of the devices on which it is being displayed. The first parameter is a pointer to an interface implemented by the ISV from which we pull content. The HRESULT Remove(const CONTENT_ID in_contentId) method allows the ISV to remove a specific piece of content from any devices. The parameter is the content ID of the content to be removed. If the item exists in the cache of any currently connected devices, it will be removed. It is not guaranteed to be in the cache of any devices, nor is it guaranteed for devices which are currently disconnected. The HRESULT RemoveAll( ) method allows the ISV to remove all content associated with the ISV's application from the cache on all devices. The HRESULT SetEventSink(IAuxiliaryDisplayEvents * in_pEvents) method allows the ISV application to specify the callback interface to use to receive events from the device. The parameter contains a pointer to the instance of their class that implements the IAuxiliaryDisplayEvents interface. If this value is NULL or invalid, no callbacks to the ISV application are performed. The HRESULT GetDevices(DWORD * out_pdwNumDevices, IAuxiliaryDisplayCapabilities ** out_ppDevices) method allows the ISV application to enumerate the currently connected devices which have been authorized for that application. This method returns an array of pointers to IAuxiliaryDisplayCapabilities objects, which provide some information on the capabilities of each authorized device. The DWORD parameter contains the number of devices returned. The application can use this method to determine how many and what types of devices for which the application needs to generate content; if the application cares about differentiating its content based on the capabilities, this method allows the application to determine that and pre-generate the appropriate content. It is alternatively feasible for this method to return an implementation of an enumerator over the device capabilities.

The IAuxiliaryDisplayContent interface is implemented by the ISV application and is used by the API to call back and pull content from the application. The HRESULT GetContent(IAuxiliaryDisplayCapabilities * in_pCapabilities, DWORD * out_pdwSize, BYTE ** out_ppbData) method is called by the API to retrieve content from the ISV application. The manner in which this is called depends on the value of the DifferentiateContent property; if the application indicated that it cares about device capabilities, this method is called back once per device, with the first parameter being a pointer to the appropriate IAuxiliaryDisplayCapabilities interface. If the application indicated that it did not care about per-device capabilities, this method is called only once, and the first parameter is a NULL pointer. The second parameter contains a byte pointer which the user will set to point to its data. The third parameter is an out pointer which the ISV fills in with the size of the returned content. The ISV application allocates memory using CoTaskMemAlloc to return from this method call; as a result, it is the API's responsibility to free the data when done with it. The [propget] HRESULT ContentId(PCONTENT_ID out_pcontentId) method is called by the API to retrieve the content ID associated with the actual content. This method is called once regardless of whether the ISV application differentiates content based on device capabilities. It is provided on this interface for manageability purposes, to make it easier for the ISV application to track the content ID associated with any particular content. The [propget] HRESULT DifferentiateContent(BOOL * out_pfDifferentiateContent) method is called by the API to retrieve a flag indicating whether the ISV application wishes to differentiate its content based on device capabilities. Essentially, it is used to determine whether GetContent is called once per device, or once per all appropriate devices. If the value is TRUE, this indicates that the ISV application wants to be called back once per device; if the value is FALSE, it indicates that the ISV wants to be called back once per content item.

The IAuxiliaryDisplayEvents interface is implemented by the ISV application and used by the API set to call back the application with events. If the ISV application does not care about events, its need not implement this interface. However, ISV applications most likely will do so. The HRESULT ContentMissing(const CONTENT_ID in_contentId, IAuxiliaryDisplayContent ** out_pContent) event is generated by a device when a certain piece of data is required on the device but is not present. The first parameter contains the content ID of the missing content, and the second parameter is an out parameter that allows the ISV to provide that missing content. Internally, this is handled as if the ISV called IAuxiliaryDisplayContentManager::Add when processing the second parameter; the content may be sent to all devices, or only the device that had the content request. Note that the ISV application cannot determine what device generated the event. The HRESULT ApplicationEvent(IAuxiliaryDisplayCapabilities * in_pCapabilities, const DWORD in_dwEventId, const DWORD in_dwEventSize, const BYTE * in_pbEventData) event is generated by the device application and contains endpoint specific event information. A first parameter is an interface pointer describing the device from which the event originated. A second parameter is an event ID, which is unique to that particular endpoint. Each endpoint can define a set of event IDs and associated data, which can be interpreted by the ISV application. Helper objects may be provided to decode application events from the simple content format, for example. A third parameter contains the size of the event data, and a fourth parameter contains a pointer to the actual data. The HRESULT DeviceAdded(IAuxiliaryDisplayCapabilities * in_pDevice) event is generated by the API and notifies the ISV application that the application is now being displayed on an additional device. The first parameter contains a pointer to the capabilities of that new device. Note that this event may occur as a result of the user enabling an application via the auxiliary display control panel, and not solely as a result of a new device becoming connected. The HRESULT DeviceRemoved(IAuxiliaryDisplayCapabilities * in_pDevice) event is generated by the API and notifies the ISV application that the application is no longer being displayed on a device. The first parameter contains a pointer to the capabilities of the device that is being removed. Note that this event may occur as a result of the user disabling an application via the auxiliary display control panel, and not solely as a result of a device being removed.

The IAuxiliaryDisplayCapabilities interface is implemented by the API and provides the ISV application with useful information about the various devices on which the application is being displayed. The goal of this interface is to provide enough information to allow ISV applications to tailor their content (if appropriate) to the specific characteristics of different devices. A basic set of public capability IDs (PROPERTYKEYs) is provided, but allows for IHV extensibility. The HRESULT GetCapability(REFPROPERTYKEY in_pkeyCapability, PROPVARIANT * out_pvarData) method provides a generic mechanism for querying device capabilities. The first parameter is a PROPERTYKEY representing the capability to get. The second parameter is a pointer to a properly initialized PROPVARIANT. The type of the returned data depends on the type associated with that particular property. It is the caller's responsibility to free the resulting data.

CONCLUSION

As can be seen from the foregoing, the present invention provides an auxiliary display platform including an interface set by which client applications may simply and consistently interact with various types of auxiliary displays, regardless of the differences between various device implementations. The interaction comprises displaying information sent from the client application, including content and notifications to be cached or rendered on the device; also the device may send events and data to the application. To provide information and receive events, the client applications need not deal with the specific capabilities of each device, but if desired may query device capabilities to display customized information on each device. The present invention thus provides numerous benefits and advantages needed in contemporary computing.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing environment, having a main computer system and one or more auxiliary devices coupled thereto, a method comprising:

implementing an application programming interface (API), using a processor of the main computer system, by which client applications running on the main computer system provide information for sending to one or more auxiliary devices independent of any particular device implementation of the one or more auxiliary devices, wherein the API comprises a registration object, a content manager object, a lifetime manager, a devices capabilities object, and a notification manager object;

receiving a registration request at the registration object from a client application, running on the main computer system, for sending the information from the client application to at least one of the one or more auxiliary devices;

receiving a specified endpoint of the at least one of the one or more auxiliary devices from the client application during the registration request, the endpoint corresponding to a program on the at least one of the one or more auxiliary devices;

evaluating in response to the registration request, by the registration object, whether the client application is authorized to send the information to the at least one of the one or more auxiliary devices using the endpoint;

the registration object instantiating the content manager object and returning a pointer to the content manager object to the client application in response to the registration request;

receiving a request, from the client application that content be sent to the endpoint, at the content manager object;

in response to the received request, the content manager object calling back to the client application to obtain the content to send to the endpoint, and sending the content obtained from the client application to the endpoint in accordance with a particular device implementation of the at least one of the one or more auxiliary devices;

the lifetime manager listening to changes in activation status of the client application, listening to activation status of the at least one of the one or more auxiliary devices, and notifying the client application when the at least one of the one or more auxiliary devices is connected or disconnected;

the device capabilities object enumerating the at least one of the one or more auxiliary devices capabilities and returning the at least one of the one or more auxiliary devices capabilities to the client application; and instantiating the notification manager object, by the registration object, in response to a registration request from the client application directed to showing a notification on the endpoint, receiving a show notification request at an interface of the notification manager object from the client application, the notification manager object obtaining notification data from the client application in response to the show notification request from the client application, and communicating the notification data obtained from the client application to the endpoint.

2. The method of claim 1 wherein the information to send to the at least one of the one or more auxiliary devices corresponds to content, and wherein sending the information comprises pulling the information from the client application in a device-independent format.

3. The method of claim 1 wherein the information to send corresponds to a notification, and wherein sending the information comprises pulling the information from the client application in a device-independent format.

4. A non-transitory computer-readable medium having stored thereon computer-executable instructions which when executed by a processor of a computer system cause the processor to perform a method comprising:

implementing an application programming interface (API) by which client applications running on the computer system provide information for sending to one or more auxiliary devices independent of any particular device implementation of the one or more auxiliary devices, wherein the API comprises a registration object, a content manager object, a lifetime manager, a devices capabilities object, and a notification manager object;

receiving a registration request at the registration object from a client application, running on the main computer system, for sending the information from the client application to at least one of the one or more auxiliary devices;

receiving a specified endpoint of the at least one of the one or more auxiliary devices from the client application during the registration request, the endpoint corresponding to a program on the at least one of the one or more auxiliary devices;

evaluating in response to the registration request, by the registration object, whether the client application is authorized to send the information to the at least one of the one or more auxiliary devices using the endpoint;

the registration object instantiating the content manager object and returning a pointer to the content manager object to the client application in response to the registration request;

receiving a request, from the client application that content be sent to the endpoint, at the content manager object;

in response to the received request, the content manager object calling back to the client application to obtain the content to send to the endpoint, and sending the content obtained from the client application to the endpoint in accordance with a particular device; implementation of the at least one of the one or more auxiliary devices;

the lifetime manager listening to changes in activation status of the client application, listening to activation status of the at least one of the one or more auxiliary devices, and notifying the client application when the at least one of the one or more auxiliary devices is connected or disconnected;

the device capabilities object enumerating the at least one of the one or more auxiliary devices capabilities and returning the at least one of the one or more auxiliary devices capabilities to the client application; and instantiating the notification manager object, by the registration object, in response to a registration request from the client application directed to showing a notification on the endpoint, receiving a show notification request at an interface of the notification manager object from the client application, the notification manager object obtaining notification data from the client application in response to the show notification request from the client application, and communicating the notification data obtained from the client application to the endpoint.

5. A system comprising a main computer system and an auxiliary device coupled thereto, the system further comprising:

an auxiliary platform executing on the main computer system, the auxiliary platform including a client API set, the client API set comprising:

a registration object receiving a register request from a client application, running on the main computer system, for sending information from the client application to the auxiliary device, the registration object identifying the client application and an endpoint of the auxiliary device from the register request, the endpoint corresponding to a program on the auxiliary device, the registration object evaluating whether the client application is authorized to send the information to the auxiliary device using the endpoint, the registration object instantiating a content manager object, and returning a pointer to the content manager object to the client application in response to the register request;

the content manager object receiving a request that content be sent to the endpoint from the client application, the content manager object obtaining the content from the client application in response to the client application requesting the content be sent to the endpoint, and communicating the content obtained from the client application to the endpoint;

a lifetime manager listening to changes in activation status of the client application, listening to activation status of the auxiliary device, and notifying the client application when the auxiliary device is connected or disconnected;

a device capabilities object enumerating the auxiliary device's capabilities and returning the auxiliary device's capabilities to the client application; and a notification manager object instantiated by the registration object in response to another registration request from the client application directed to showing a notification on the endpoint, the notification manager object obtaining notification data from the client application in response to a show notification request from the client application, and communicating the notification data obtained from the client application to the endpoint.

6. The system of claim 5 wherein the notification data includes at least one item of data in a set containing title, message, image data and expiration time.

7. The system of claim 5 wherein the client application communicates content to the auxiliary device based on a contract corresponding to the endpoint, and wherein the content manager does not interact with the content.

8. The system of claim 5 wherein the content obtained from the client application is identified by a content identifier that is unique to that client application program.

9. The system of claim 5 further comprising another client application, wherein the client API set isolates each of the client applications from one another with respect to auxiliary device communication.

10. The system of claim 5 further comprising another endpoint, wherein the client application communicates content to each endpoint based on separate contracts, each contract corresponding to each endpoint.

11. The system of claim 10 wherein each endpoint corresponds to different programs on different auxiliary devices.

12. The system of claim 5 wherein the lifetime manager provides lifetime-related notifications to the client application corresponding to an operating state of the auxiliary device.

* * * * *

UNITED STATES PATENT AND TRADEMARK OFFICE
CERTIFICATE OF CORRECTION

| | | |
|---|---|---|
| PATENT NO. | : 7,784,065 B2 | Page 1 of 1 |
| APPLICATION NO. | : 11/053186 | |
| DATED | : August 24, 2010 | |
| INVENTOR(S) | : Daniel J. Polivy et al. | |

It is certified that error appears in the above-identified patent and that said Letters Patent is hereby corrected as shown below:

In column 1, line 28, after "functionality" delete "25".

In column 17, line 11, before "with" insert -- ( --.

In column 30, line 34, in Claim 4, delete "device;" and insert -- device --, therefor.

Signed and Sealed this

Fifteenth Day of February, 2011

David J. Kappos
*Director of the United States Patent and Trademark Office*